(12) United States Patent
Peronek

(10) Patent No.: US 7,028,857 B2
(45) Date of Patent: Apr. 18, 2006

(54) PLASTIC WATER BOTTLE AND APPARATUS AND METHOD TO CONVEY THE BOTTLE AND PREVENT BOTTLE ROTATION

(75) Inventor: Michael H. Peronek, Brunswick, OH (US)

(73) Assignee: FCI, Inc., Cleveland, OH (US)

( * ) Notice: Subject to any disclaimer, the term of this patent is extended or adjusted under 35 U.S.C. 154(b) by 229 days.

(21) Appl. No.: 10/446,027

(22) Filed: May 28, 2003

(65) Prior Publication Data

US 2004/0238475 A1    Dec. 2, 2004

(51) Int. Cl.
*B65D 1/02*    (2006.01)

(52) U.S. Cl. .......................................... 215/40; 215/42

(58) Field of Classification Search ................. 215/40, 215/42–44, 46; 406/88, 198
See application file for complete search history.

(56) References Cited

U.S. PATENT DOCUMENTS

| | | | |
|---|---|---|---|
| 1,055,796 A | 3/1913 | Recht | |
| 1,912,677 A | 6/1933 | Williams | |
| D92,953 S * | 8/1934 | Gaynor ........................ | D9/545 |
| 2,106,464 A | 1/1938 | Meyer | |
| 2,113,176 A * | 4/1938 | Fabrice ........................ | 215/252 |
| 2,134,359 A * | 10/1938 | Fabrice ........................ | 215/256 |
| D181,718 S | 12/1957 | Pree | |
| D182,882 S | 5/1958 | Pree | |
| 2,987,313 A | 6/1961 | Bjering et al. | |
| D192,942 S | 5/1962 | Pree | |
| 3,075,331 A | 1/1963 | Stanley | |
| 3,262,247 A | 7/1966 | Scholle | |
| 3,338,470 A * | 8/1967 | Newberry .................... | 221/67 |
| 3,432,989 A | 3/1969 | Bouzereau | |
| 3,461,649 A | 8/1969 | Ermer, Jr. et al. | |
| 3,499,567 A | 3/1970 | Spotts | |
| 3,771,284 A | 11/1973 | Boeckmann et al. | |
| 3,805,488 A | 4/1974 | Holstein | |
| 3,812,646 A | 5/1974 | Baldyga et al. | |
| 3,831,344 A | 8/1974 | Over | |
| 3,875,725 A | 4/1975 | Carmichael | |
| 3,946,540 A | 3/1976 | Solberg et al. | |
| 4,006,837 A * | 2/1977 | Gates et al. ................. | 215/340 |
| 4,098,059 A | 7/1978 | Chattillion | |
| 4,114,347 A | 9/1978 | Morris et al. | |

(Continued)

FOREIGN PATENT DOCUMENTS

JP    61-93093    5/1986

(Continued)

*Primary Examiner*—Sue A. Weaver
(74) *Attorney, Agent, or Firm*—Fay, Sharpe, Fagan, Minnich & McKee, LLP

(57) ABSTRACT

A plastic container for beverages to replace a container having a round flange with a round flange diameter and which is adapted to be conveyed by air along a track with inwardly extending track rails spaced from one another a set distance. The plastic container replacing the replaced container without significant modifications to the conveying system including the inwardly extending track rails of the track. The container including a central axis, an upper mouth portion, a neck portion coaxial to the axis with a diameter, a cylindrical sidewall, a lower base and an anti-rotation flange below the upper mouth portion having a polygonal peripheral edge with a shape including a plurality of flats and a plurality of apexes each located between adjacent flats. Each apex being diametrically opposite one of the flats. The peripheral edge having a diametrical distance between each of the apexes and the flat opposite the apex. The diametrical distance being at most only slightly less than the round flange diameter of the replaced container.

43 Claims, 11 Drawing Sheets

U.S. PATENT DOCUMENTS

| | | |
|---|---|---|
| 4,120,135 A | 10/1978 | Baldyga |
| 4,143,754 A | 3/1979 | Eldred |
| 4,273,246 A | 6/1981 | Thompson |
| 4,280,612 A | 7/1981 | Nagano |
| 4,284,370 A | 8/1981 | Danier et al. |
| 4,295,320 A | 10/1981 | Willingham |
| D272,521 S | 2/1984 | Glenn |
| 4,559,760 A | 12/1985 | Daniels et al. |
| 4,624,098 A | 11/1986 | Trendel |
| 4,663,913 A | 5/1987 | Trendel |
| 4,755,404 A | 7/1988 | Collette |
| 4,765,119 A | 8/1988 | Aidlin et al. |
| 4,793,120 A | 12/1988 | Herzog |
| 4,817,363 A | 4/1989 | St. Clair |
| 4,905,447 A | 3/1990 | Margaria |
| 4,930,288 A | 6/1990 | Juenkersfeld |
| 4,939,890 A | 7/1990 | Peronek et al. |
| 4,950,350 A | 8/1990 | Zodrow et al. |
| 4,966,780 A | 10/1990 | Hargraves et al. |
| 4,978,015 A | 12/1990 | Walker |
| 5,123,227 A | 6/1992 | Shibauchi |
| 5,161,919 A | 11/1992 | Smith et al. |
| 5,217,737 A | 6/1993 | Gygax et al. |
| 5,220,767 A | 6/1993 | de Santana |
| 5,224,586 A | 7/1993 | Naka et al. |
| 5,398,485 A | 3/1995 | Osifchin |
| 5,408,801 A | 4/1995 | Molinaro |
| 5,423,159 A | 6/1995 | Bankuty et al. |
| 5,437,521 A | 8/1995 | Ouellette |
| 5,457,936 A | 10/1995 | Neel |
| 5,542,233 A | 8/1996 | Graffin |
| 5,581,975 A | 12/1996 | Trebbi |
| D377,603 S | 1/1997 | Smith |
| 5,603,423 A | 2/1997 | Lynn et al. |
| 5,732,528 A | 3/1998 | Peronek et al. |
| 5,816,029 A | 10/1998 | Sweeny |
| 5,826,400 A | 10/1998 | Martin et al. |
| 5,850,935 A * | 12/1998 | Luburic et al. ............. 220/675 |
| 5,913,438 A | 6/1999 | Beck et al. |
| 5,934,042 A | 8/1999 | Peronek |
| 5,989,661 A | 11/1999 | Krishnakumar et al. |
| 5,996,796 A | 12/1999 | Kvitrud et al. |
| 6,276,546 B1 | 8/2001 | Davis et al. |
| 6,698,160 B1 | 3/2004 | Peronek et al. |
| D488,381 S | 4/2004 | Peronek |
| D488,721 S | 4/2004 | Peronek |
| D489,264 S | 5/2004 | Peronek |
| 6,752,284 B1 * | 6/2004 | Akiyama et al. ........... 215/379 |
| 6,834,478 B1 | 12/2004 | Peronek et al. |

FOREIGN PATENT DOCUMENTS

| | | |
|---|---|---|
| JP | 6-247432 | 9/1994 |
| JP | 07242222 A * | 9/1995 |
| JP | 08198388 A * | 8/1996 |
| JP | 2000-79988 | 3/2000 |
| JP | 2001/114237 | 4/2001 |
| JP | 2001/270507 | 10/2001 |

* cited by examiner

PLASTIC WATER BOTTLE AND APPARATUS AND METHOD TO CONVEY THE BOTTLE AND PREVENT BOTTLE ROTATION

The present invention relates to containers for fluids, and more particularly to a plastic bottle for non-carbonated beverages that resists deformation and damage during the capping process. The present invention also relates to the art of capping containers as they are moved along a preselected path, and more particularly to an improvement in a capping machine which prevents rotation of the container as a cap is being tightened onto the neck of the container. The invention is particularly applicable to a container guide which retains the container in the filling and/or capping machine as the container passes through the machine and will be described with particular reference thereto.

BACKGROUND OF THE INVENTION

Blow-molded plastic bottles for containing liquids at elevated pressures are known and have found increasing acceptance. Such containers are accepted particularly in the beverage industry as disposable containers for use with effervescent or carbonated beverages, especially carbonated soft drinks. These plastic containers can reliably contain carbonated beverages generating internal pressures as high as 100 psi or more and can be inexpensively manufactured. Typically, these plastic bottles have a cylindrical shape which reliably contain carbonated beverage products, can be easily handled, can be inexpensively manufactured, and have stability when filled and unfilled. Such containers have most frequently been manufactured from plastic materials such as polyethylene terephthalate (PET) by, for example, blow molding a portion of PET into a mold formed in the shape of the container. The biaxial expansion of PET by blow molding imparts rigidity and strength to the formed PET material, and blow molded PET can provide economically acceptable wall thicknesses, with clarity in relatively intricate designs, sufficient strength to contain pressures up to 100 psi and more, and resistance to gas passage that may deplete contained beverages of their carbonation.

One problem in plastic container design is the propensity of PET to succumb to the deleterious effects of stress cracking and crazing, which is manifested as almost imperceptible streaks in the plastic, but ultimately can become complete cracks due to stress and other environmental factors. Relatively unstretched portions of a plastic container that have low degrees of crystallinity due to the lack of biaxial expansion, such as the central bottom portion, are particularly susceptible to crazing and stress cracking. The relatively unstretched central portion of the container bottom is also frequently provided with a plurality of depending feet that are formed with distention-resistant but stress concentrating areas, and the composite effect on such areas of stress and strain due to the internal pressure of the container and external environmental factors can lead to crazing, stress cracking and container bottom failure.

One commercial cylindrical beverage container that seeks to avoid such problems is formed with a full hemispherical bottom portion and provided with a separate plastic base member fastened over the hemispherical bottom portion to provide a stable base for the container. Such containers are in common use for large multi-liter containers for carbonated beverages, even though the provision of a separate plastic base member imposes increased container height, and increased manufacturing and material costs for each container. Another commercial cylindrical beverage container that seeks to avoid such problems includes a "champagne" type base having concave, or "domed" eversion-resisting central bottom portions merging with the cylindrical container sidewalls at an annular ring which forms a stable base for the container. The central domed portion of a champagne-based plastic container generally creates clearance for the gate area of the container which is intended to resist deformation due to the internal pressure of the container but is sensitive to stress cracking. However, containers with champagne bases require a greater wall thickness in the base portion to resist the distending and everting forces of the internal pressure and form stress concentrations at the annular base-forming transition between the concave central bottom portion and cylindrical sidewall that are prone to stress cracking and rupture when the container is dropped.

More recently, hemispherical bottom portions and concave champagne-like bottom portions have been combined, in which a plurality of feet are formed in the bottom of a blow molded container. These designs frequently seek eversion-resistant concave central bottom portions formed by a plurality of surrounding feet that are interconnected by a plurality of generally downwardly convex hemispheric rib portions. Many of such container designs providing footed bottles are in commercial usage. Such container designs are still subject, in the absence of relatively thick bottom wall portions, to distention of their concave central portions due to high internal pressures that can create "rockers" and significantly increased interior container volume with lower fluid levels, all of which are unacceptable to purchasers. Efforts to increase the eversion and distention resistance of the concave bottom portions of such footed containers with thinner bottom wall thicknesses have frequently led to bottom portions including small radii of curvature and discontinuous and abrupt transitions between adjoining surfaces that provide stress concentration, crazing and stress cracking sites. Many of these problems have been overcome by various bottom configurations such as illustrated in U.S. Pat. Nos. 4,120,135; 4,978,015; 4,939,890; 5,398,485; 5,603,423; 5,816,029; 5,826,400; 5,934,024; and 6,276,546. The bottles disclosed in these patents are incorporated herein by reference to illustrate some examples of the type and shape of bottles that can be used in the present invention.

Much of the plastic bottle design has been directed to the carbonated bottle industry. However, the non-carbonated beverage market such as water, sport drinks, fruit drinks and the like has continued to grow. It is not uncommon that plastic bottles originally designed for carbonated beverages are used for non-carbonated beverages. However, the use of these plastic bottles has been problematic, especially during the bottling of the non-carbonated beverage. The gas in carbonated beverage exerts a force on the interior of the bottle, thus resisting the deformation or collapse of the base of the bottle during the capping of the bottle. As a result, the base and walls of the plastic bottle can be made of a thinner material, which is a significant cost savings to the manufacturer. The absence of gas in non-carbonated beverages has resulted in increased deformation and/or damage of base of the plastic bottle during the bottling process. In order to address this problem, increased wall thickness for the sidewalls and base of the plastic bottle has been used. Although the increased wall thickness of the plastic bottle reduces the incidence of deformation and/or damage of the base of the plastic bottle during the bottling process, the increased wall thickness translates into increased material costs. Plastic bottles or containers that include a plastic base attachment have also been used to address this problem. However, the use of the plastic base attachment also increases the cost of the bottle or container. Bottling manufactures that bottle both carbonated and non-carbonated beverages must now maintain additional inventory of various bottle or container configurations and thicknesses.

Machines in the bottling industry for filling containers or capping containers after being filled are well known in the prior art. As defined herein, such machines are collectively referred to as bottling machines. Reference may be had to U.S. Pat. Nos. 5,934,042; 5,816,029; 5,732,528; 4,939,890; 4,624,098; and 4,295,320 which are incorporated by reference herein for a description of applications for conventional type bottling machines. Such machines will not be described in detail in this specification.

Generally, a capping and/or filling apparatus includes a rotatable star wheel mechanism for moving the containers through the machine. The star wheel generally includes a mechanism for supporting the container which is generally arranged about the periphery of the star wheel. An infeed mechanism or conveyor is utilized to bring the containers to an entry point of the star wheel, and an outfeed mechanism or conveyor is similarly mated to the rotatable star wheel mechanism to transfer the capped (or filled) containers from an exit point of the star wheel. A stationary rear guide extending generally between the entry and exit points is generally spaced radially outwardly from the neck support assembly on the rotatable star wheel. This rear guide functions to retain the containers in the individual pockets of the neck support assembly as the star wheel rotates. In a conventional capping apparatus, a turret capper head is directly over the capper star wheel and moves in synchronous rotation with the capper star wheel. In a bottle filling apparatus, a filling head is located above the capper star wheel. Either of the capper head or the filling head is driven axially downward at pre-determined periods of time to place a tightened cap onto the container or to place product within the bottle. Each capper head generally employs a clutch mechanism whereby the capper head is rotated and driven axially downward at a predetermined force and torque to tighten the cap on the container.

Within a bottling plant or facility, a single capping or filling machine is used to fill or cap many different sized containers. In the soft drink industry such size container can include a 12-oz bottle, a 20-oz bottle, a 1-liter bottle, a 2-liter bottle, or others. Positive control of the containers throughout the machine is typically maintained by holding the containers by the neck. Thus, based upon a predetermined control height, all the containers will be guided, and/or be partially or fully suspended throughout the filling or capping process by the container neck flange. Normally, the container will be rested on or be suspended above the normal wear surface. Mounted on the basic shaft of the bottling machine is a hub which supports the mounting plate and star wheel thereon. As the shaft is rotated, the hub rotates the star wheel, thus moving the containers through the machine to accomplish the capping and filling process. Smaller star wheels include and neck support assemblies integral with the hub. Larger star wheel assemblies include neck guide assemblies mounted on the star wheel. Each neck guide assembly has fingers extended therefrom and guides and/or supports the neck of the container.

In order to retain the control height for different sized containers, each container requires a different size and/or shape neck support bracket and lower body guide support for the sidewall of the container. Thus, in each instance where the container size to be run is changed, it is necessary to changeover different aspects of the bottling machine including those portions of the machine which are specific to the particular container size being run on the line. In a bottling plant, such a changeover requires the use of skilled labor to remove the equipment which is specific for a particular size container and replace it with substitute equipment which is specific for a different size container. Thousands of containers pass through a bottling machine each hour. Maintaining this volume is very important to meet both consumer and industry demands as well as plant capacity. As such, the down time associated with a changeover to different size containers is a significant loss both in dollars and productivity due to reduced output capacity, idle manpower and the skilled work force required to complete a changeover. In order to address this problem, a modified container guide was developed and is disclosed in U.S. Pat. No. 5,732,528 which is incorporated herein by reference. U.S. Pat. No. 5,732,528 discloses an improved container guide system for a bottling machine, which includes a redesigned star wheel and rear container guides that enable the body guide, or body star, on the star wheel and the sidewall guide on the rear container guide to be capable of quick adjustment without the necessity of removing and reinstalling different guides for different sized bottles. Changeover mainly requires depressing a button on each guide to release an adjustable locking mechanism and to slide the guide along a positioning rod to a desired new position. A positioning block located on the guides holds the adjustable locking mechanism and effectively moves the body guide and/or sidewall guide to its new position where the button is released to lock the guide in place. The easy adjustment also allows for quick and easy removal of the guide and replacement with another guide having the size requirements desired. This improved container guide system significantly reduces the down time of a bottling line due to a changeover. No tools are needed to effect the changeover as it relates to container guides, thus a machine operator is capable of depressing the button for releasing and sliding the body guide, or body star, on the star wheel or the sidewall guide on the rear container guide to a second position where the button is released and the guide is locked into place. The improved guide system also reduces the number of parts necessary to effect a changeover on a bottling line and provides a positive adjustable control guide once the initial modifications to install the invention are made to the bottling machine.

With respect to the cap or the closure, for years, the crown was the dominant closure employed on containers and is still in use today in the beer industry. The crown closure eventually was partially replaced by caps or closures commonly called "roll-on" caps. This type of closure comprised a cap shell of aluminum which was inserted over the threaded neck of the container and then secured in place by rolling threads in situ into the walls of the cap shell. Capper heads which performed the rolling operation typically exerted downward forces of up to 500 pounds onto the neck of the container. This force, of course, was transmitted to the base of the container and thereat developed a sufficient frictional force with the capper star wheel base to prevent container rotation during the capping process. Over time, the roll-on cap was partially replaced with plastic or metal locking type, threaded caps. In the beverage industry, threaded safety caps have a frangible connection at the cap base thereof which will herein be referred to as a "lock band". In the case of a metal cap, the capper heads simply crimped the lock band about the container neck portion beneath the lowermost thread. In the case of a plastic cap, heat is applied to the lock band of the cap after the cap is tightened onto the filled container and then shrunk to the neck of the container. Plastic caps with heated lock bands can be applied to either plastic or glass containers. In the plastic cap application, the force of the capper head is generally reduced to a downward thrust of about 50–60 pounds. This force is not sufficient to generate a sufficient frictional force at the base of the container to prevent the container from rotating in the pocket of the capper star wheel. Container rotation in the capper pocket prevented adequate cap tightening. Accordingly, several different concepts have been employed to prevent container rotation for plastic cap applications. For example, the container was shaped with a wedge sidewall configuration and the transfer mechanisms between the various star wheels was modified to feed the containers into configured pockets. Additionally, a high friction material such as polystyrene was applied to the bottom of the container, especially for glass bottles, so as to better grip the base of the capper star wheel and enhance the frictional, anti-rotation force. Such modifications, while functional, were not acceptable. The consuming public did not accept configured containers. Adding friction material to the container materially increased its cost, and its effectiveness was diminished in the event the base of the capper star wheel became wet or was subjected to oil, both of which are common occurrences in the operation of a bottling plant. U.S. Pat. No. 4,624,098, which is incorporated herein by reference, disclosed the use of a belt to urge the container against the rear guide, thus increasing the friction between the side of the container and the rear guide which, when added to the frictional force at the base of the container, helped to prevent container rotation during the tightening of the cap. This capping design has proven acceptable in capping applications where the downward force exerted on the container head from the capping head is as low as 50–60 pounds.

More recently, plastic, threaded safety caps or closures have been developed which do not require the application of heat to set or position the lock band. By tapering the bottle neck beneath the lowermost thread and also tapering the edge of the lock band, the lock band simply snaps in a locking position vis-a-vis the tapered fit when the cap is tightened to a predetermined position. This position occurs when the axial downward force on the cap from the capper head is about 15–20 pounds. This low capper force makes retention of the container within the pocket very difficult, even with the use of very strong elastic bands in the pocket such as disclosed in U.S. Pat. No. 4,624,098. Accordingly, the device now in conventional use for such threaded plastic caps, at least when used on plastic containers, is a anti-rotation device developed by Metal Box p.l.c. This device includes a capper pocket that has an arbitrarily designated forward converging surface and a rearward converging surface. The forward converging surface has backwardly facing teeth which oppose the tightening direction of rotation of the capper head. The rearward converging surface is smooth and acts, in conjunction with rear guide, as a cam surface to drive the container neck against the teeth of the forward converging surface. This device has several limitations. For instance, the toothed anti-rotation device is limited to plastic bottle applications in which the backwardly facing teeth can grip and permanently indent the surface without fracturing the container. In glass bottles, the shock loading when the backwardly facing teeth grip the neck could result in container fracture. Furthermore, although the forward and rearward converging surfaces are designed to be easily replaced, the replacement cost for each capper pocket approaches several hundred dollars and is relatively expensive. In addition, the device is functionally limited. Not all containers have straight neck portions underneath the threads. Many bottle designs curve or taper the neck, and when this occurs, the backwardly facing teeth make detrimental point contact with the container neck. More significantly, the diameter of the neck portions of a plastic container, whether tapered or straight, typically varies from the nominal dimension. The dimensional variation means that for some containers, the neck of the container will be cocked or wrenched into point indentation contact with the backwardly facing teeth as the cap is tightened. This will mark or score the neck wall and such marking is, of course, aggravated if the neck tapers and is not straight. Since the plastic used to manufacture the container is somewhat permeable, the scoring permits the gas of a carbonated beverage within the container to more easily permeate through the plastic, contributing to a "flat" beverage. More critical, though, is that the neck marking or scoring acts as a stress riser to cause an occasional container failure. This is unacceptable. Additionally, the container is aesthetically marred.

These problems were successfully addressed in U.S. Pat. No. 4,939,890, wherein an upwardly directed knife is used to prevent the rotation of the container during the capping process. The knife engaged the lower surface of a circular flange at the bottom of the threaded neck of a plastic container to prevent rotation of the plastic container. A mechanism for externally applying a downward force on the body of the container being capped, which force was independent of the downward force created by the capping operation, was used during the capping process. This anti-spin or anti-rotation mechanism has been successful. The anti-rotation device of U.S. Pat. No. 4,939,890 is the most successful arrangement for applying plastic threaded safety caps onto the top of plastic containers where the caps do not require heat to set or position the lower lock band around the neck of the container.

Although the capping mechanism disclosed in U.S. Pat. No. 4,939,890 addressed many of the past deficiencies of past capping mechanisms, the improved capping mechanism required a mechanism for exerting a downward force on the container which was expensive and was dependent upon certain structural characteristics at the upper portion of the container itself. Changes in container configuration often require a new force-exerting mechanism. In addition, the use of the knife slightly disfigured the plastic containers, thereby making the containers less aesthetically pleasing to the consumer. U.S. Pat. Nos. 5,934,042; 5,826,400; 5,816,029; and 5,398,485 disclose anti-rotation mechanisms that address these issues. These patents disclose an anti-rotation mechanism used on a capping machine, which accomplishes the results of the anti-rotation arrangement disclosed in U.S. Pat. No. 4,939,890, but which does not rely upon developing downward frictional force on the top of the container during the capping operation.

The anti-rotation devices disclosed in U.S. Pat. Nos. 5,934,042; 5,826,400; 5,816,029; and 5,398,485, which are incorporated herein by reference, are particularly applicable for use with a plastic container having a pedaloid base (e.g. base with multiple legs), which is somewhat standard in the soft drink industry. These bases include a plurality of downwardly extending feet or pads, generally four or five, separated by diverging recesses. The plastic containers with pedaloid bases are capped in standard machines having a lower plate rotated with the capping heads and having contoured recesses or nests directly aligned with the capping heads and pockets of the rotating star wheel. A plurality of specially contoured recesses that match the pedaloid base configuration are used to receive the bases of the containers as the containers are moved by the star wheel. Since the containers rest upon the lower circular wear plate or ring and are held within a contoured nest on the plate, rotation of the containers is prevented by an interference between the lower wear plate and the bottom, or base, of the container. This arrangement is completely different from the concept of increasing the friction at the top of the container or otherwise preventing rotation of the container by frictional force.

The provision of a lower circular wear plate with machined recesses, each matching the contour of a pedaloid base of the plastic containers, can be expensive. Each of the contoured recesses must be specially produced and accurately matched with respect to the actual shape of each pedaloid base of the container being processed. Consequently, each container required its own lower support wear plate. Indeed, when the filled containers being capped are changed from a four pad pedaloid base to a five pad pedaloid base, a completely new, specially machined plate for supporting the pedaloid bases must be assembled onto the machine. This arrangement for providing a plate rotatable with the star wheel for supporting the lower pedaloid bases of the container demanded a plate which must be accurately machined for use with specific star wheels. Another anti-rotation system included an arrangement for fixing the support member or wear plate in a position spaced from the turret where the containers slide along a rib as the containers are moved around the arcuate path dictated by the movement of the capping head and the star wheel. The rib extended into the lower recess of the pedaloid base of the individual container to prevent rotation of the container as the capping head drove the cap onto the upper threaded neck of the container. By using this construction, a lower support plate carrying the upstanding rib was fixed and did not rotate with the star wheel. The upwardly extending rib prevented rotation of the container during the capping operation. This use of a fixed rib constituted an improvement over other arrangements for using a lower plate with specially contoured recesses to provide interference against rotation of the container by the capping head; however, it required a modification of the capping machine and was expensive to retrofit.

Two anti-rotation mechanisms that overcome these past problems are disclosed in U.S. Pat. Nos. 5,934,042 and 5,816,029. These anti-rotation mechanisms use a standard wear plate of the type rotating with the star wheel of a rotary capping machine and are adapted to accommodate cylindrical containers with an outer cylindrical periphery and a pedaloid base with spaced pads separated by radial recesses extending from a center recess of the base. In the capping machine, the containers are moved along a circular path by a star wheel that has outwardly protruding pockets supporting the necks of the containers while they are supported at the lower position by a rotating wear plate. The wear plate is a flat ring rotated in unison with the star wheel about the machine axis so the containers moving along a given circular path are carried by and supported on the wear plate. The ring constituting the wear plate has an upwardly facing flat surface with a series of container receiving nests movable along the circular path as the ring is rotated by the turret of the capping machine. Each of these nests has an inner area constituting a flat surface and at least one elongated bar-like abutment projecting upwardly from the flat surface of the ring and extending in a direction radial of the inner area of the nests. In practice, two or three of the elongated bar-like abutments project radially outwardly from the inner area defining the nest onto which a container is supported. These radially projecting abutments are faced by an angle defined as 360°/X, wherein X is a number of pads in the pedaloid base. The rib extends into the lower recess of the pedaloid base of the individual container to prevent rotation of the container as the capping head drives the cap onto the upper threaded neck of the container.

Although these prior art capping mechanisms have had excellent success in the bottling of carbonated beverages, problems with damage to the base of the plastic container have resulted when bottling non-carbonated beverages such as water, fruit drinks and the like. Most of the plastic bottles or containers used in the beverage industry are plastic containers made from blow molded polyethylene terephthalate (PET). These plastic containers include "champagne" type bases or bases having a plurality of feet to structurally enhance the base of the plastic bottle or container. Much of the plastic container design has been directed to the carbonated beverage industry. However, the non-carbonated beverage market such as water, sport drinks, fruit drinks and the like has continued to grow. It is not uncommon that plastic containers originally designed for carbonated beverages are used for non-carbonated beverages. However, the use of these plastic containers has been problematic, especially during the bottling of the non-carbonated beverage. The gas in a carbonated beverage exerts a force on interior of the container, thus resisting the deformation or collapse of the base of the container during the capping process. As a result, the base and walls of the plastic container can be made of a thinner material, which is a significant cost savings to the manufacturer. The absence of gas in non-carbonated beverages has resulted in increased deformation and/or damage of the base of the plastic container during the bottling process. In order to address this problem, increased wall thickness for the side walls and base of the plastic container has been used. Although the increased wall thickness of the plastic container reduces the incidence of deformation and/or damage of the base of the plastic container during the bottling process, the increased wall thickness translates into increase material costs. Alternatively, plastic containers that include a plastic base attachment have also been used to address this problem. However, the use of the plastic base attachment also increases the cost of the container. Bottling manufacturers that bottle both carbonated and non-carbonated beverages must now maintain additional inventory of various bottle or container configurations and thicknesses. In addition, plastic containers that do not have a pedaloid base could not be used in a bottling apparatus that had anti-wear plates to prevent rotation of the container. For instance, containers having flat bases or champagne type bases were not prevented from rotation on such wear plates.

Another aspect of the bottling process relates to conveying the bottles to and from the capping machine. As can be appreciated, large volumes of bottles must be fed to first the filling portion of the process and then later to the capping machine. Furthermore, due to the scale of these bottling operations and the sizes of the machines used therein, the conveying portion of the bottling process can be significant. Therefore, it is advantageous to provide low cost methods to convey both the unfilled and the filled bottles to and from the bottling apparatuses. As stated above, downtime can be costly which necessitates quick changeovers from one bottle size to the next or from carbonated beverages to non-carbonated beverages. As can also be appreciated, a changeover which necessitates a modification to the conveying system can be costly in both man hours used to make the changeover and loss profits for the time in which the operation is shut down. Thus, it is preferred that modifications to the conveying system be minimized from one bottle to the next.

It has been found that air powered conveyors can be used to inexpensively convey the empty bottles to the filling and capping machines. Due to the lightweight plastic materials used in the construction of these bottles, air pressure can effectively move a large number of bottles if the air is properly directed. The use of pressurized air to convey the empty bottles is disclosed in U.S. Pat. Nos. 4,284,370; 5,161,919 and 5,437,521, which are incorporated herein by reference for showing air conveying systems. However, these air conveying systems must effectively utilize the neck flange of the bottle and the outer configuration of the bottle to support and move the bottle in the desired direction. Modifications to the neck flange and/or bottle configuration can have adverse affects to the effectiveness of the conveying system. In one respect, the air power conveyor systems rely on the neck flange to support the bottle as it is conveyed. The neck flange provides a good support structure and also minimizes the frictional or drag force produced by the supporting structure of the conveying system. Thus, if the neck flange becomes disengaged from the rails of the conveying system, the bottle can become jammed or can fall from the conveying system. Therefore, it is important that the neck flange be configured to reliably maintain the engagement with the conveying rails of the air conveyor at all times to minimize downtime in the conveying process.

Yet another aspect of using an air conveying systems, is the control of the pressurized air. As can be appreciated, the pressurized air will only move the bottles if it engages at least one surface of the bottle. In addition, containing the pressurized air is also a factor. Air escaping from the conveying system can reduce the efficiency of the conveyor. As a result, the tolerances between the rails of conveying system and the outer configuration of the neck of the bottle are a factor in how well the conveyor will move a particular bottle.

In view of the present state of the art for bottling machines, there is a need for a bottling machine that can be used for non-carbonated beverages which resists deformation and/or damage to the base and/or body of the plastic beverage container during the bottling process, and which can be used to inhibit or prevent rotation of a variety of container designs during the bottling and/or capping process. Furthermore, in view of the present state of the art for plastic beverage bottles, there is a need for a plastic beverage container that can be used for non-carbonated beverages which resists deformation and/or damage to the base and/or body of the plastic beverage container during the bottling and conveying processes, and which has substantially the same material cost as standard plastic bottles used for carbonated beverages.

SUMMARY OF THE INVENTION

The invention provides an improved container for non-carbonated beverages including an anti-rotation neck flange that prevents rotation of the container during capping. In this respect, the anti-rotation neck flange according to the present invention has a polygonal peripheral edge that can be engaged by the capping machine to prevent rotation during the capping process.

The improved container is designed to have a low cost and weight, to be manufacturable from a plastic material by molding with minimal plastic material in its walls, to have excellent stability in both filled and unfilled conditions, and to have maximal volumes with minimal heights in easily handled diameters. The invention will be described with respect to the containers for non-carbonated beverages; however, the improved container can be used with non-carbonated or carbonated beverages.

In addition, the present invention is applicable to containers for the bottling of liquids other than beverages (e.g., food products other than beverages, cleaning products, automotive products, paint products, etc.). Furthermore, the container will be described as being principally made of plastic material; however, the container can be formed of other materials (e.g., glass, metal, polymers and/or co-polymers other than plastic, etc.).

The improved plastic container includes a neck portion, a sidewall portion and a lower bottom-forming portion. The body and/or base of the improved plastic container can be formed and/or configured to resemble configurations commonly used in prior art plastic bottles for carbonated and non-carbonated beverages. This further helps the improved bottle be used in connection with existing bottling equipment including the capping and conveying systems.

According to another aspect of the invention, the lower bottom-forming portion of the improved plastic container can be formed into a variety of configurations such as, but not limited to, a lower bottom-forming portion having a plurality of feet, a lower portion bottom-having a champagne configuration, a lower bottom-forming portion having a substantially flat base, and the like.

According to still another aspect of the invention, the improved plastic container includes an upper mouth-forming portion adapted to receive a fluid and a cap to cover the upper mouth. The design and configuration of the mouth opening can be generally the same as used in prior art plastic bottles used for carbonated beverages; however, it can be different. In this respect, the opening in the upper mouth-forming portion can be substantially circular. The upper mouth-forming portion can also include one or more threads that are adapted to receive a cap. The one or more threads have a configuration that is generally the same as the threads used on prior art plastic bottles; however, they could be different.

According to yet another aspect of the present invention, the anti-rotation flange is at least partially engagable with one or more components of a capping machine, and wherein upon at least partial engagement with the one or more components of the capping machine, the non-circular configuration resists or prevents rotation of the improved plastic container when a cap is inserted on the upper mouth-forming portion of the improved plastic container.

According to yet another aspect of the invention, the anti-rotation flange includes a plurality of apexes each located between adjacent flats such that each apex is diametrically opposite one of the flats.

According to still another aspect of the present invention, the anti-rotation flange on the improved plastic container is configured to resists disengagement from a guide railing as the improved plastic container is conveyed to and/or from the bottle filling location. During the bottling process, empty containers are conveyed to a bottle filling location by a rail system wherein the neck flange rests on the top of the rails and/or is at least partially guided by the rails. Compressed air is used to move the containers along the rails to the bottle filling location. However, other mechanisms could be used to move the containers along the rails. After the container has been filled, the flange may also be used to convey and/or at least partially guide the filled container from the bottling location by another rail system. In prior art plastic bottles, the flange was circular. The circular flange did not allow the prior art plastic bottle to fall through the railing even when the plastic bottle rotated as the plastic bottle was conveyed along the rails. The anti-rotation flange according to the present invention is configured to be substituted for the standard fully circular flange on prior art plastic containers and to resist disengagement from or falling through the rail system. As such, the improved plastic container can be used on existing plastic bottling lines without having to modify the conveying system for the improved plastic container to and/or from the bottle filling location.

According to yet another aspect of the invention, the distance between each of the plurality of apexes and its corresponding opposite flat of the anti-rotation flange defines a diametrical distance which is sized to allow the container of the present invention to reliably replace a prior art round flange bottle without significant modification to the existing air conveyor systems therefor.

According to a further aspect of the invention, the diametrical distance is at most only slightly smaller than the round flange diameter of the replaced container.

According to even another aspect of the invention, the diametrical distance is equal to or greater than the round flange diameter of the replaced container.

According to even yet another aspect of the invention, the plurality of apexes together define an outer apex diameter and the central point of the flats together define an inner flat diameter, the outer apex diameter being greater than the round flange diameter of the replaced container.

According to a further aspect of the invention, the anti-rotation flange includes a bottom surface which has a flat portion perpendicular to the bottle's axis.

According to even yet a further aspect of the invention, the flat portion of the bottom surface is spaced from the neck of the bottle.

According to another aspect of the invention, the inwardly extending track rails have upwardly facing guide surfaces and the flat portion of the flange's bottom surface engages the upwardly facing surface as the container is being conveyed.

According to still another aspect of the invention, the anti-rotation flange includes a polygonal peripheral edge which is a heptagon.

According to a further aspect of the present invention, the anti-rotation flange of the improved plastic container can substantially support the improved container as a cap is inserted onto the mouth of the container. As a result, the anti-rotation flange both prevents rotation of the container during capping and supports the container during capping.

According to yet a further aspect, the present invention provides an improved device on the capping machine to support the anti-rotation flange of the container. The device includes a bottle support plate that at least partially supports the container at the flange below the neck of the container during the capping process. The bottle support plate is designed to at least partially counter the axially downward force exerted on the container when the capping machine exerts a downward force on the top of the container as the cap is being applied to the container. The counteractive effect of the bottle support plate results in a reduction or elimination of compressive forces exerted on the body and/or base of the container. As a result, damage to the base and/or body of the container is reduced or eliminated during the capping process. The support plate can also or alternatively be designed to at least partially counter the axially downward force exerted on the container when the container is at least partially filled with a fluid. Depending on the flow rate of the fluid into the container, the viscosity of the fluid, and/or the temperature of the fluid, the fluid can cause damage to the base of the container during the filling process. The bottle support plate can reduce or eliminate such damage to the base of the container during the filling process by partially or filly supporting the container such that the base of the container does not bear the full load or force of the fluid during the filling process. The bottle support plate can be made from a number of different materials that are resistant to wear and which can at least partially support the weight of the container during the capping and/or filling process. Such materials include, but are not limited to, metal (e.g. stainless steel, aluminum, etc.), plastics, fiberglass, rubber, etc. While the support plate is used to partially or fully support plastic containers, it can be used in connection with other types of containers such as glass containers, metal containers, and the like.

According to a further aspect of the invention, the bottle support plate fully supports the container during the liquid filling process, thereby countering most, if not all, of the downward force being applied to the container during the fluid filling process.

According to yet a further aspect of the invention, the bottle support plate is designed to receive at least a portion of the container below the anti-rotation flange of the container such that at least a portion of the bottom surface of the anti-rotation flange engages a support ledge of the bottle support plate when the bottle support plate is at least partially supporting the container. The support ledge of the bottle support plate can include a side opening adapted to at least partially receive a portion of the container below the anti-rotation flange. In one particular non-limiting design, the opening in the support ledge includes a generally C-shaped configuration; however, other shapes can be used. The C-shaped configuration is generally used for containers having a generally circular portion beneath the anti-rotation flange of the container. As can be appreciated, when the shape of the container beneath the anti-rotation flange is not generally circular, other configurations can be used for the support ledge of the bottle support plate to closely match such other shapes. In another and/or alternative non-limiting design, the C-shaped configuration is sized so as to inhibit or prevent the anti-rotation flange of the container from passing through the support ledge when the container is being filled and/or capped. In still another and/or alternative non-limiting design, the opening in the support ledge is shaped and sized to support no more that about 50–55% of the under side of the outer perimeter of the anti-rotation flange of the container when the container is being at least partially supported by the support ledge during the filling and/or capping process. Typically, the opening in the support ledge is shaped and sized to support no more that about 49% of the under side of the outer perimeter of the anti-rotation flange of the container.

In yet another aspect of the present invention, the bottle support plate includes an anti-rotation wall that is adapted to at least partially engage the outer perimeter of the anti-rotation flange of the container to inhibit or prevent the container from rotating when a cap is applied to the mouth of the container during the capping process. The anti-rotation wall effectively inhibits or prevents rotation of the container when the anti-rotation wall engages a container that has a non-circular anti-rotation flange. As stated above, in prior bottling operations, prior art plastic bottles were prevented from rotating during the capping process by using a sharp implement to engage a portion of the prior art plastic bottle (e.g. circular flange, bottle base, etc.) to prevent rotation of the plastic bottle.

According to yet another aspect of the invention, the anti-rotation wall of the bottle support plate is configured to at least partially mate with an anti-rotation flange that includes a plurality of substantially straight surfaces positioned about at least a portion of the anti-rotation flange. The anti-rotation wall of the bottle support plate can be configured to at least partially mate with an anti-rotation flange that includes an odd number of straight surfaces. In one particular, non-limiting design, the anti-rotation wall of the bottle support plate is configured to at least partially mate with an anti-rotation flange having a plurality of substantially straight surfaces which have substantially the same length. In another and/or alternative particular, non-limiting design, the anti-rotation wall of the bottle support plate is configured to at least partially mate with an anti-rotation flange having a plurality of substantially straight surfaces that form a polygonal shape (e.g. pentagon, heptagon, nonagon, etc.).

According to even yet another aspect of the invention, the anti-rotation wall is shaped and sized to engage no more than about 55% of the outer perimeter of the anti-rotation flange when the container is being at least partially supported by the support ledge of the bottle support plate during the filling and/or capping process. Typically, the anti-rotation wall is shaped and sized to engage no more than about 49% of the outer perimeter of the anti-rotation flange of the container. As can be appreciated, the anti-rotation wall can be shaped and sized to engage more than 55% of the outer perimeter of the anti-rotation flange of the container.

According to still another aspect of the present invention, the bottle support plate includes a support ledge and an anti-rotation wall that partially or fully counter the downward force applied to the upper portion of the container during the capping process. As a result, the bottle support plate can be positioned such that when the anti-rotation flange is supported by the support plate, the base of the container is suspended as the cap is at least partially inserted on the mouth of the container. As such, prior art anti-rotation wear plates are not required.

According to a further aspect of the present invention, the bottle support plate includes an anti-rotation wall that extends upwardly from the support ledge of the bottle support plate. The front surface of the anti-rotation wall can be substantially perpendicular to at least a portion of the support ledge. The anti-rotation wall can also include a front surface having a wall portion that is non-perpendicular to at least a portion of the support ledge. The non-perpendicular wall portion can be at an angle with at least a portion of the support ledge that is between about 90–130°, and more typically about 90–110°, and even more typically about 95–105°. The angling of the anti-rotation wall facilitates the proper positioning of the anti-rotation flange of the container on the bottle support plate. In addition, the angling of the anti-rotation wall facilitates the removal of the anti-rotation flange of the container from the bottle support plate after the cap has been inserted onto the container.

According to another aspect of the invention, the height of the anti-rotation wall from the support ledge is substantially uniform.

According to still another aspect of the invention, the height of the anti-rotation wall from the support ledge at least partially varies.

According to yet another aspect of the invention, the anti-rotation wall is at least partially spaced from at least a portion of the front edge of the support ledge. Furthermore, the width of the support ledge, defined between the front edge of the support ledge and the anti-rotation wall, can be substantially uniform or can vary.

According to still a further aspect of the present invention, the bottle support plate includes a support ledge that is recessed from the top surface of the bottle support plate. The recess provides a space to allow the capping mechanism to insert a cap on the container without having to contact the bottle support plate. As can be appreciated, the recess in the bottle support plate is not required. The recess can have a semi-circular shape to accommodate the shape of the capping mechanism. As can be appreciated, other shapes of the recess can be used.

According to yet a further aspect of the present invention, the bottle support plate is removably connected to the bottling and/or capping mechanism. Bottling machines commonly include a rotatable star wheel and a rear container guide assembly spaced radially outwardly from the rotatable star wheel to retain the container within the rotatable star wheel. The rotatable star wheel typically includes a hub secured to a vertically extending drive shaft which rotates about a drive shaft axis. Extending radially outwardly from the hub are typically one or more bottle support assemblies. Each bottle support assembly is mounted on the star wheel. The bottle support plate is designed to be removably connected to one or more of the bottle support assemblies. The ability to remove the bottle support plate from the bottle support assembly results in 1) easier repair and/or replacement of a damaged bottle support plate, 2) less downtime for the repair and/or replacement of a damaged bottle support plate, and/or 3) the ability to quickly and easily change out one or more bottle support plates to accommodate a certain type of container. The bottle support plate can be connected to the bottle support assembly by use of, but not limited to, bolts, screws, pins, adhesives, clamps, latches, nails, and the like. In addition, the support plate can be connected to the bottle support assembly using quick connect fastening systems which are also know in the art. As can be appreciated, the bottle support plate can be essentially irremovably connected to the bottle support assembly. If such a connection is desired, it can be accomplished by a variety of means such as, but not limited to, welding, soldering, bolts, screws, pins, rivets, adhesives, clamps, latches, nails, and the like.

According to even yet another aspect of the invention, the flat surface portion of the anti-rotation flange bottom at least partially engages the support plate during capping.

One object of the present invention is to provide an improved plastic container that resists deformation and/or damage during the capping and/or filling of the improved plastic container with a fluid.

Another object of the present invention is to provide an improved plastic container that can be filled with non-carbonated fluids and/or carbonated fluids.

Yet another object of the present invention is to provide an improved plastic container that includes an anti-rotation flange.

Still another object of the present invention is to provide an improved plastic container that can be used in standard bottling facilities.

Still yet another object of the present invention is to provide an improved plastic container having an anti-rotation flange that can be reliably used with existing bottle conveying systems without major modifications.

A further and/or alternative object of the present invention is to provide a bottling and/or capping mechanism that reduces or prevents damage to a container during the capping and/or filling of the container.

Another and/or alternative object of the present invention is to provide a bottling and/or capping mechanism that includes a bottle support plate that at least partially engages an anti-rotation flange of a container, thereby inhibiting or preventing deformation and/or damage to the container during the capping and/or filling of the container.

Yet another and/or alternative object of the present invention is to provide a bottling and/or capping mechanism that can be used to fill and cap containers with non-carbonated fluids and/or carbonated fluids.

Still another and/or alternative object of the present invention is to provide a bottling and/or capping mechanism that includes a removable bottle support plate.

Still yet another and/or alternative object of the present invention is to provide a bottle support plate that can be used on existing bottling and/or capping mechanisms.

A further and/or alternative object of the present invention is to provide a mechanism for inhibiting or preventing container rotation in a bottling and/or capping machine which is operable on either plastic or glass containers.

Still a further and/or alternative object of the present invention is to provide an arrangement for preventing container rotation in a bottling and/or capping machine in which the containers are not marked or scored in any deleterious manner.

Yet a further and/or alternative object of the present invention is to provide an anti-rotation device in a bottling and/or capping machine which does not cause failure of the container.

Still yet a further and/or alternative object of the present invention is to provide an economical, easily replaceable mechanism for preventing container rotation in a bottling and/or capping machine.

These and other advantages will become apparent to those skilled in the art upon the reading and following of this description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF THE INVENTION

Figure 1:
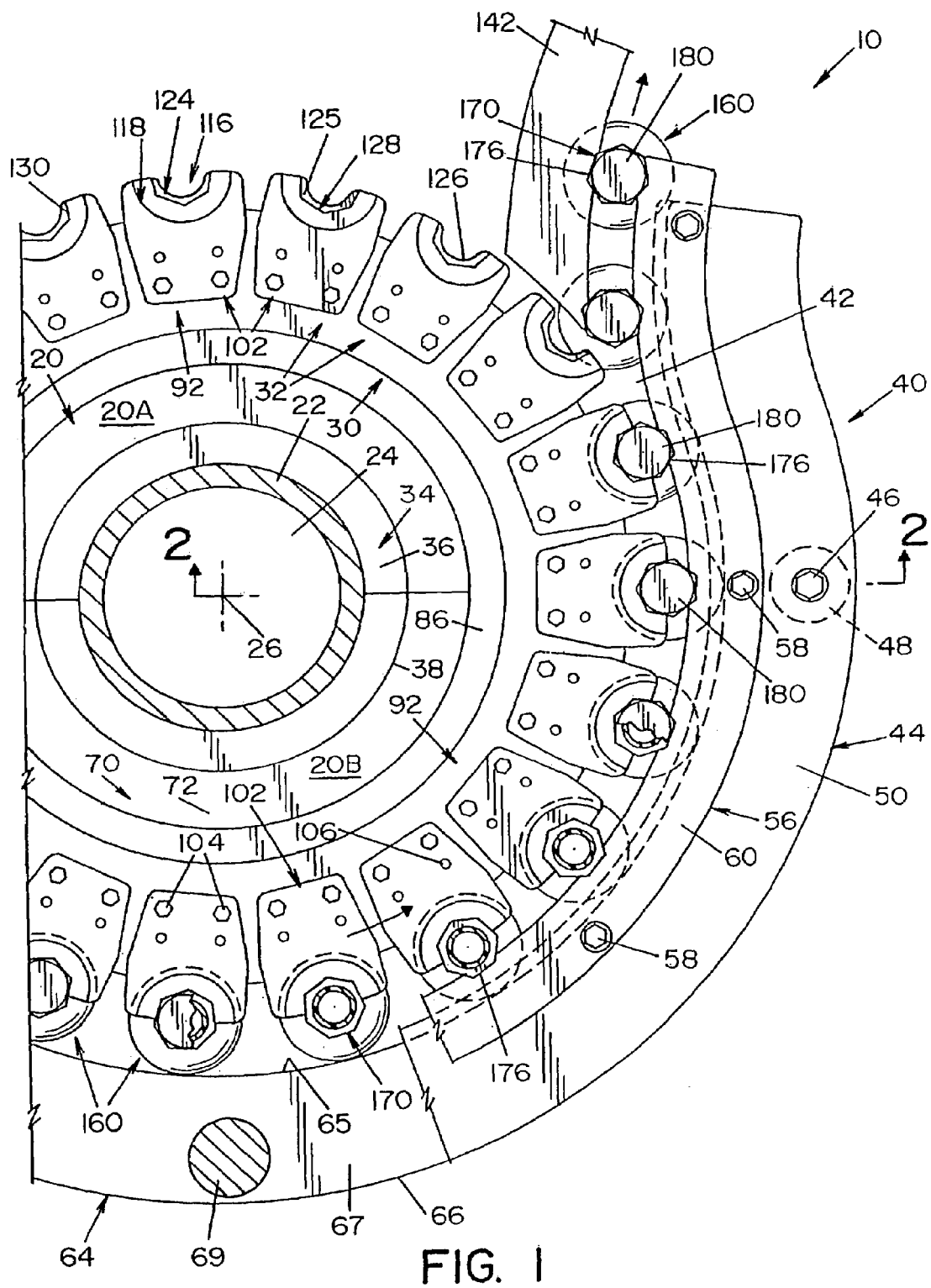
FIG. 1 is a partial plan view of a bottling machine employing the rear container guide. assembly of the present invention.
Figure 2:
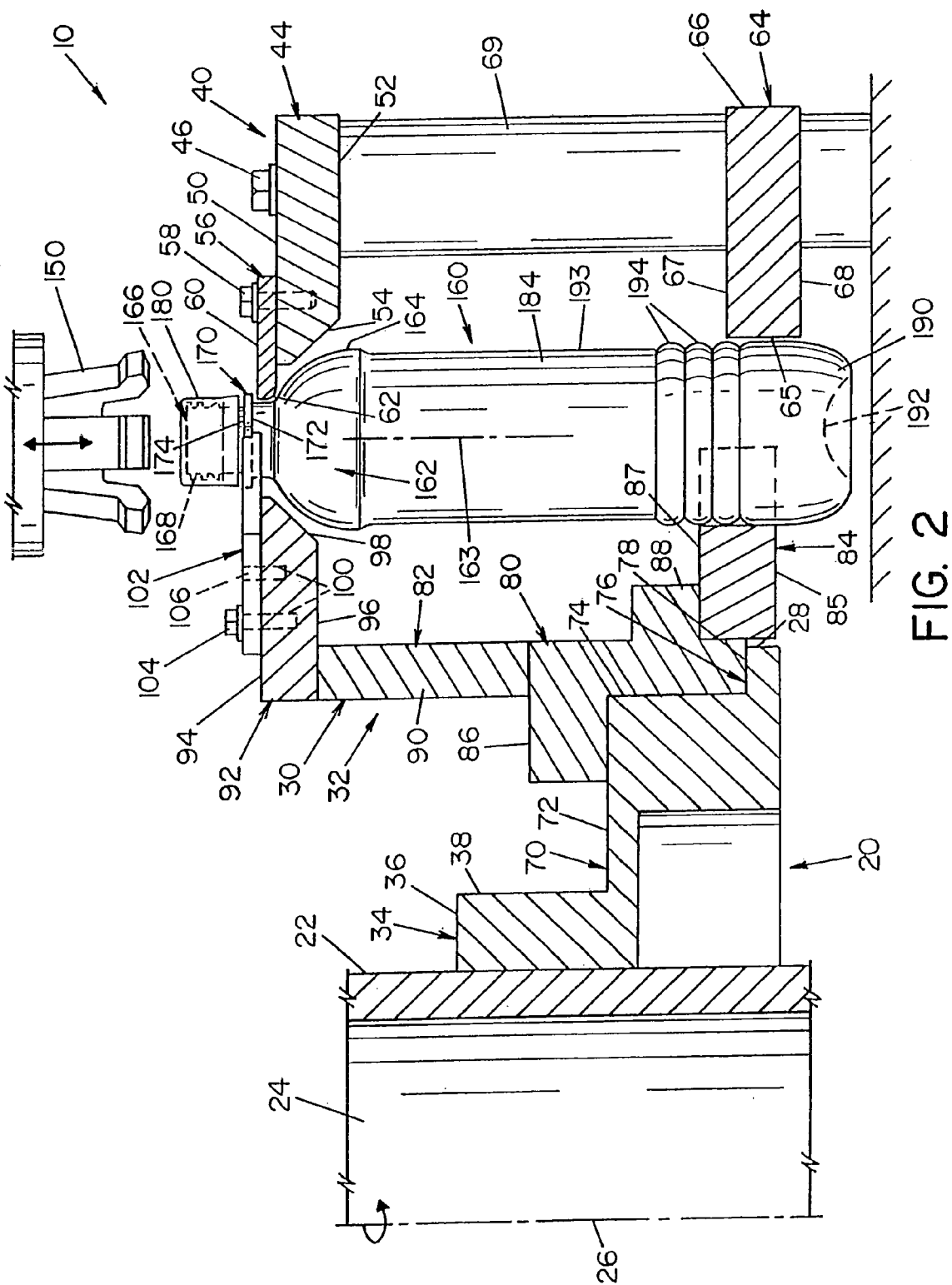
FIG. 2 is a cross-sectional elevation view taken along line 2—2 of FIG. 1.

Referring now to the drawings wherein the showing is for the purpose of illustrating preferred embodiments of the invention only and not for the purpose of limiting the same, FIGS. 1 and 2 show various portions of what is defined as a bottling machine 10. The bottling machine as defined herein includes the filling and/or the capping bottling equipment. The filling equipment is that which fills containers with product, such as, but not limited to, a non-carbonated beverage. The capping equipment is that which applies a cap, crown or other closure to the container.

Bottling machine 10 includes a rotatable star wheel 20 and a rear container guide assembly 40 spaced radially outwardly from rotatable star wheel 20 for retaining the bottles 160 within rotatable star wheel 20. Depending upon the application of bottling machine 10, an additional star wheel (not shown) or conveyor (not shown) is mated to rotatable star wheel 20 at a fixed entry point (not shown) on rotatable star wheel 20. Bottles 160 are rotated out of rotatable star wheel 20 at a fixed exit point 42 to an outfeed star wheel (not shown) or conveyor (not shown) leading to further processing or handling equipment.

FIG. 2 illustrates a capping machine having capper head 150 for placing a closure 180 on bottle 160. Rotatable star wheel 20 essentially comprises a hub 22 secured to a vertically extending drive shaft 24 which rotates about a drive shaft axis 26.

Extending radially outwardly from hub 22 are a plurality of bottle support assemblies 30. As shown, each of bottle support assemblies 30 is mounted on star wheel 20 at a bottle support station 32. Each of bottle support assemblies 30 is arranged about the periphery 28 of rotatable star wheel 20, which is generally circular. Each bottle support assembly 30 is removable from star wheel 20 through other embodiments, known in the industry.

Rear container guide 40 includes an annular rear neck guide 44 secured in a stationary manner by bolts 46 to a frame member 48. Rear neck guide 44 has a top surface 50, a bottom surface 52 and an inclined edge surface 54 which extends radially outwardly from top surface 50 to bottom surface 52. An annular neck block 56 is secured by fasteners 58 to top surface 50 of rear neck guide 44. Neck block 56 has a top surface 60 which, as shown in FIG. 2, is adapted to be in contact with the underside 172 of anti-rotation flange 170 of bottle 160. Neck block 56 also includes an inclined edge surface 62 extending radially outward from top surface 60. Fixed rear guide 40 and specifically annular neck block 56 functions to support anti-rotation flange 170 and bottle 160 by retaining bottle 160 on rotatable star wheel 20.

Star wheel 20 extends radially outwardly from hub 22 and has an annular neck portion 34 secured at its inner end to hub 22. Specifically, a neck portion top surface 36 extends radially outwardly to a neck portion edge surface 38 which is generally coaxial with drive shaft axis 26. Neck portion edge surface 38 terminates at a support plate portion 70 having a support plate top surface 72 which also extends radially outward from hub 22 and is generally parallel to top surface 36. Support plate top surface 72 extends radially outwardly to a support plate edge surface 74 which then extends downwardly to a ledge plate portion 76 having a ledge plate top surface 78 parallel to both of top surfaces 36 and 72. Top surface 78 extends radially outwardly to periphery 28 of star wheel 20.

As shown, star wheel 20 is used on large capacity bottling machines. This means that periphery 28 is circular and shaft 24 is fitted with a single hub 22 and star wheel 20 can be used with many different sizes of bottles run on the same bottling line. Bottle support assemblies 30 for each size bottle are provided and are also capable of being removed and replaced for different size bottle applications. It will be appreciated that for smaller capacity machines or for different applications within the same bottling line, a star wheel may instead comprise a hub and star wheel portion having individual pockets within the star wheel itself that serve a function similar to bottle support assembly 30. In such an instance, individual hubs are designed and removable when it is desired to convert a line to different size bottles. It will be appreciated that in this instance, star wheel 20 is split into two halves 20A and 20B to permit installation and repair without disturbing, for instance, capper head 150 shown schematically in FIG. 2, and further to allow ease of assembly and disassembly by reducing the weight of individual pieces. Such difference in a hub does not affect the present invention.

Bottle support assemblies 30 comprise three distinct pieces including a neck support bracket 80, a neck guide 82 and a bottom body guide 84. Neck support bracket 80 is attached to star wheel 20 with neck guide 82 attached to a top surface 86 of neck support bracket 80 and bottom body guide 84 attached to guide support 88 of neck support bracket 80.

Neck guide 82 includes a vertical standard 90 extending upwardly from top surface 86 and a bracket 92 extending perpendicular from vertical standard 90 radially outwardly. Bracket 92 includes a top surface 94, a bottom surface 96 and an inclined edge surface 98 which extends radially outwardly from top surface 94 to bottom surface 96. The top surface includes four openings 100. Anti-rotation plate or bottle support plate 102 is secured to top surface 94 of bracket 92 by hex-screws 104 and pins 106. Anti-rotation plate 102 includes two openings 108 for screws 104 and two openings 110 for pins 106, which are used to secure and position the anti-rotation plate to bracket 92. One or more anti-rotation plates can be removed from bracket 92 and replaced by simply removing the screws. As can be appreciated, other means for connecting the anti-rotation plate to the bracket in a removable or non-removable manner can be used (e.g. bolts, nails, clips, welding, soldering, rivets, adhesive, clamps, and/or the like). In addition, quick connect/disconnect fastening systems known in the industry can be utilized.

Figure 3:
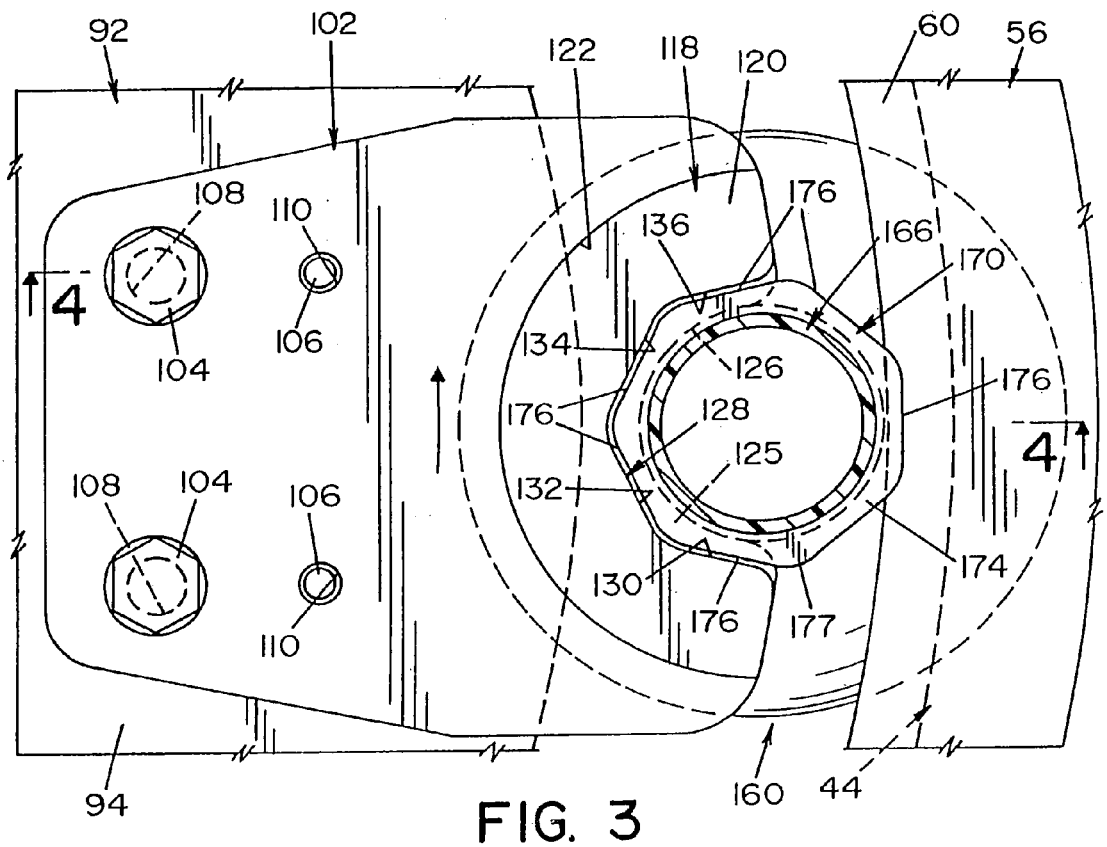
FIG. 3 is a partial plan view of bottle support plate and guide rail in accordance with the present invention.
Figure 4:
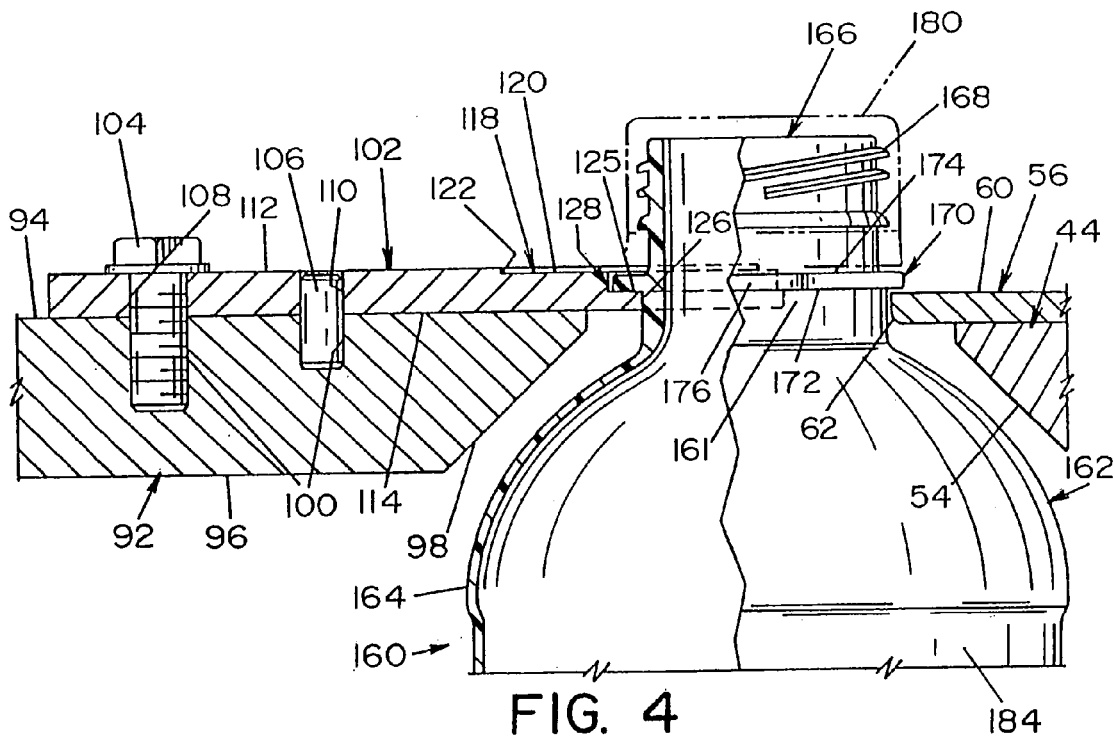
FIG. 4 is a cross-sectional elevation view taken along line 4—4 of FIG. 3.
Figure 5:
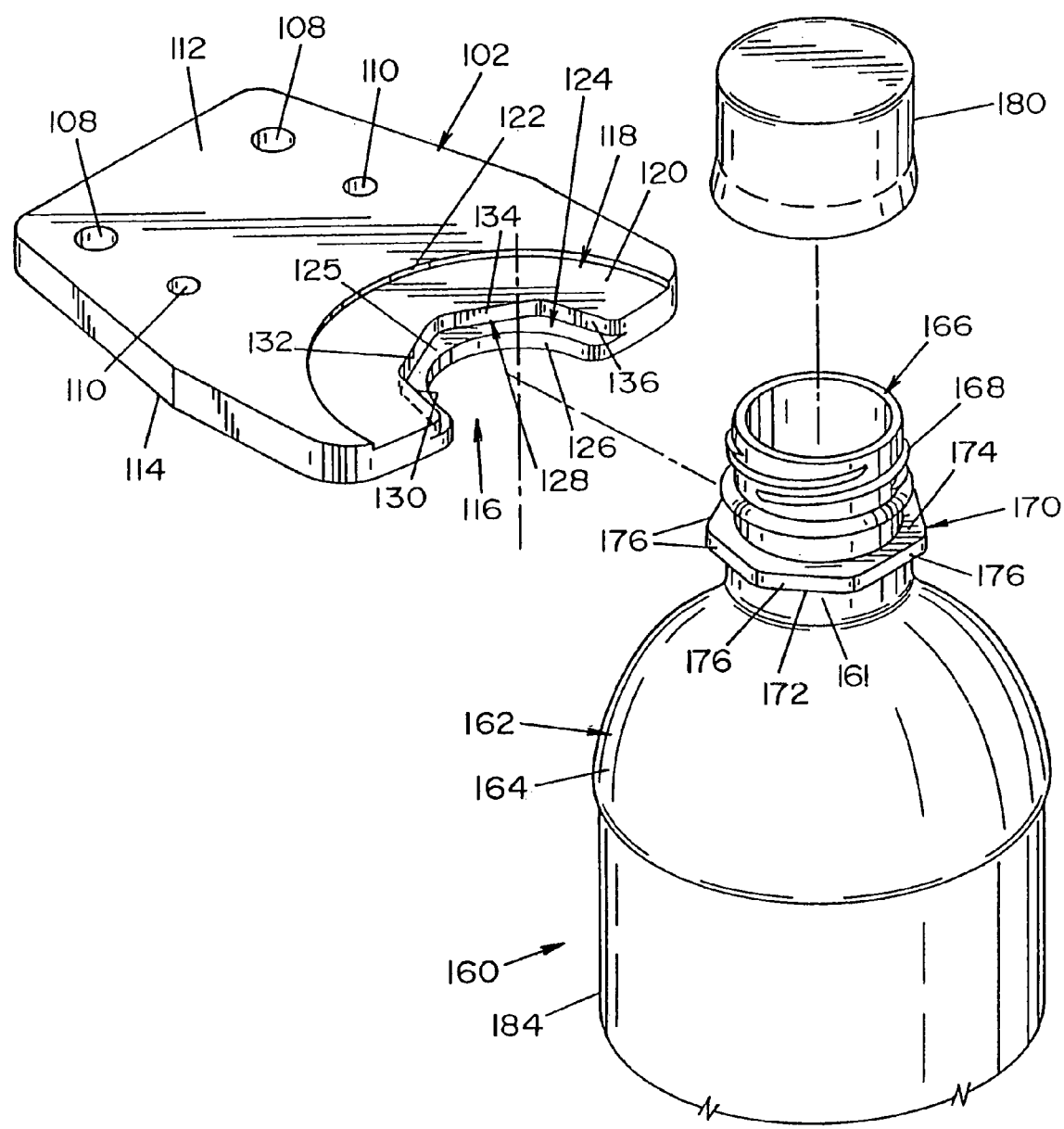
FIG. 5 is an exploded perspective view showing the support plate, the anti-rotation flange of a bottle and the cap for the bottle.

Referring now to FIG. 3–5, anti-rotation plate 102 has a top surface 112 and a bottom surface 114. Each anti-rotation plate includes a pocket 116 that is adapted to receive anti-rotation flange 170 of bottle 160. As shown in FIG. 3, the width of the anti-rotation plate is greater at the end including the pocket than at the end including openings 108. The narrowing of the anti-rotation plate at the connection end facilitates connecting and orienting multiple anti-rotation plates on bracket 92. As can be appreciated, other configurations of the anti-rotation plate can be used to facilitate in connecting and orienting multiple anti-rotation plates on bracket 92.

The top surface of the anti-rotation plate includes a recessed region 118 that surrounds pocket 116. The top surface 120 of recessed region 118 generally lies in the same plane as top surface 112. End wall 122 is generally perpendicular to top surfaces 112 and 120. As can be appreciated, end wall 122 can be oriented non-perpendicular to top surface 120. The recessed region provides clearance for capper head 150 during the capping process. As can be appreciated, the recessed region can be eliminated from the anti-rotation plate.

Pocket 116 includes a support ledge 124 that is adapted to partially or fully support bottle 160 during the bottling and/or capping process. As such, deformation and/or damage to the base of the bottle, such as plastic bottles, during the bottling and/or capping process is reduced or eliminated. It should be noted that while not shown, the base of bottle 160 can rest on any type of wear plate known in the industry. In this respect, by partially or fully supporting bottle 160 during the capping process, the bottle or container itself is not subjected to the axial capping forces. As stated above, the forces necessary to secure the cap can damage plastic bottles. Support ledge 124 includes a top surface 125 which generally lies in the same plane as top surface 112. Support ledge 124 is designed to receive underside 172 of anti-rotation flange 170 of bottle 160. The front face 126 of the support ledge is semi-circular in configuration and encompasses an angle of up to about 180°. The semi-circular configuration of the front face is adapted to receive the circular portion of the neck of the bottle located below the anti-rotation flange. As can be appreciated, the shape of the front face can be other than semi-circular. Extending upwardly from the support ledge and to the top surface of the recessed region is anti-rotation wall 128. The plane of the anti-rotation wall is generally perpendicular to top surface 120 and support ledge 124. As can be appreciated, the plane of the anti-rotation wall can be oriented so as to form an angle of between about 90–130° between the anti-rotation wall and support ledge 124. The top portion of the anti-rotation wall can abruptly converge with top surface 120 of recessed region 118, or have a smoother transition in the form of a curved surface.

Anti-rotation wall 128 includes four walls 130, 132, 134, 136 that are generally straight. Walls 132 and 134 have generally the same length, as do walls 130 and 136. The angle between the walls is generally about 128.6°. Such an angle accommodates a anti-rotation flange on the bottle having seven equally spaced sides (e.g. heptagon). As can be appreciated, the configuration of the anti-rotation wall can include more or less walls, and/or the one or more walls can have a non-prevent rotation of the anti-rotation flange of the bottle during the capping process when the anti-rotation flange is positioned in pocket 116.

When the anti-rotation flange of the bottle is positioned in pocket 116 of the anti-rotation plate, top surface 60 of neck block 56 is positioned at an area diametrically opposed to pocket 116. Contact with top surface 60 coacts with anti-rotation plate 102 and functions to maintain bottle 160 within pocket 116 as star wheel 20 rotates. Pocket 116 inhibits or prevents rotation of bottle 160 when a closure 180 is tightened thereon by capper head 150.

In one particular non-limiting configuration of the pocket of the anti-rotation plate, the anti-rotation plate is made of stainless steel (e.g. 304, 316, etc.). As can be appreciated, the anti-rotation plate can be made of or include other materials. Typically the anti-rotation plate is electro-polished. The thickness of the anti-rotation plate is about 0.1875 inch. As can be appreciated, other thicknesses can be used. Openings 108 have a diameter of about 0.28 inch and openings 110 have a diameter of about 0.19 inch. As can be appreciated, other shapes and sizes of the openings can be used. Recessed region is recessed about 0.016 inch and has a radius of about 1.125 inch. As can be appreciated, other depths of the recess can be used. Alternatively, it can be appreciated that the recess can be eliminated from the anti-rotation plate. The height of anti-rotation wall is about 0.093 inch. As can be appreciated, other heights can be used. The anti-rotation wall has four walls having an angle of about 128.6° between the walls. As can be appreciated, other angles can be used and/or other numbers of walls can be used. The distance of the center of each wall from the center of pocket 116 is about 0.618 inch. As can be appreciated, other distances can be used. The front face of support ledge 124 has a radius of curvature of about 0.531 inch. As can be appreciated, other radii of curvature can be used. As a result, the width of the support ledge from the center of each wall 130, 132, 134, 136 to front face 126 is about 0.087 inch.

As shown in FIG. 2, bottom body guide 84 includes a body guide bottom surface 85 and a body guide upper surface 87. Bottom body guide 84 is rigidly attached to neck support bracket 80 and specifically to guide support 88. It will be appreciated that each bottom body guide 84 can have a retaining pocket (not shown) having a semi-circular cross section. As such, bottom body guide 84 contacts the sidewall of bottle 160 at an area vertically downward from pocket 116 of anti-rotation plate 102 and at an area diametrically opposed to a sidewall contact established by an annular sidewall rear guide 64 to retain bottle 160 substantially vertical while star wheel rotates bottles 160 from a fixed entry point to fixed exit point 42.

Annular sidewall rear guide 64 has an inner radial surface 65 and an outer surface 66, the radius of each surface 65 and 66 terminating at drive shaft axis 26. Sidewall rear guide 64 includes an upper surface 67 and a lower surface 68. A through-sleeve extends between upper surface 67 and lower surface 68 at at least one location in sidewall rear guide 64. It will be appreciated that the relative size and relationship of rear guide 64 can remain generally constant for many size bottles since, for instance, the diameter of a one-liter, a 12-ounce and a 20-ounce bottle are generally the same. It will also be appreciated that the that rear guide 64 can be completely changed out and replaced with a different size rear guide 64. Suspended from rear neck guide 44 is at least one vertical post or positioning rod 69. The positioning rod can include circumferential concave grooves (not shown) spaced along a length between the lower end and an upper end of the vertical post. Vertical post 69 is attached to rear neck guide 44 by the hex head bolts 46. Sidewall rear guide 64 can be attached to vertical post 69 by various means. One such arrangement is disclosed in U.S. Pat. No. 5,732,528, which is incorporated herein by reference.

Referring now to FIG. 2–8, bottle 160 is in the form of a non-carbonated beverage bottle. As can be appreciated, bottle 160 can also be used for carbonated beverages. Bottle 160 includes an upper neck 161 and mouth-forming portion 162, a cylindrical sidewall portion 184 extending around the longitudinal axis 163 of the container, and a lower base-forming portion 190. The upper neck and mouth-forming portion 162 provides a neck-forming transition 164 leading to the container mouth 166. The transition portion 164 can take any conveniently usable and moldable shape such as, but not limited to, a frustoconical shape, hemispherical shape, ogive shape, or some other shape. A thread 168 positioned adjacent mouth 166 is designed to accept a threaded cap 180 commonly used to close the beverage bottles; however, the mouth-forming portion of the containers can be provided with means to accommodate other types of closures.

Figure 6A:
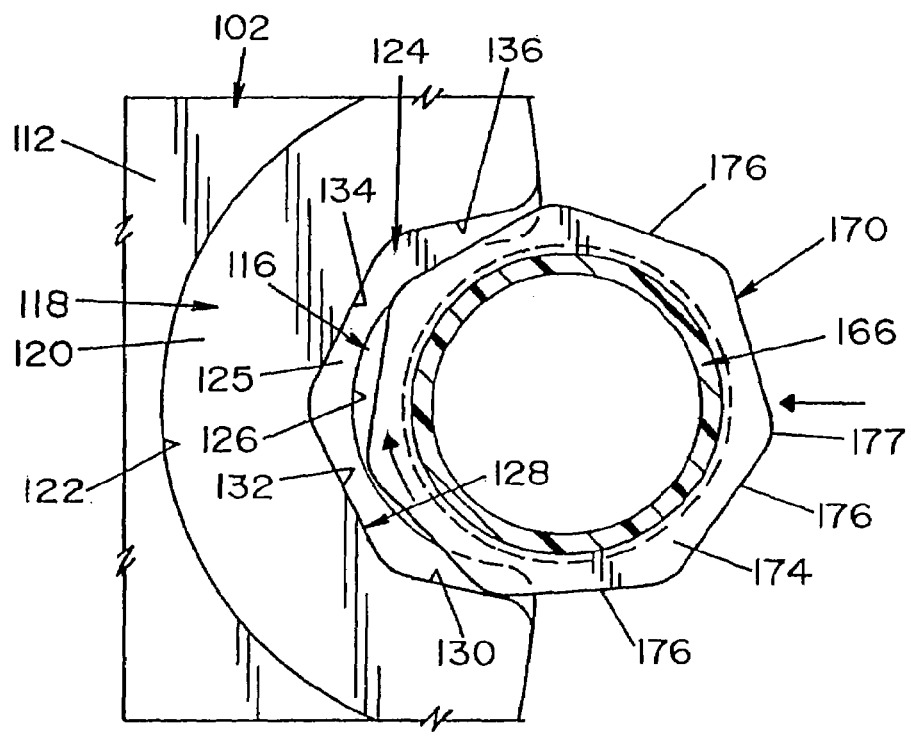
FIGS. 6A and 6B are partial plan views of the position of the anti-rotation flange of a bottle in the support plate.
Figure 6B:
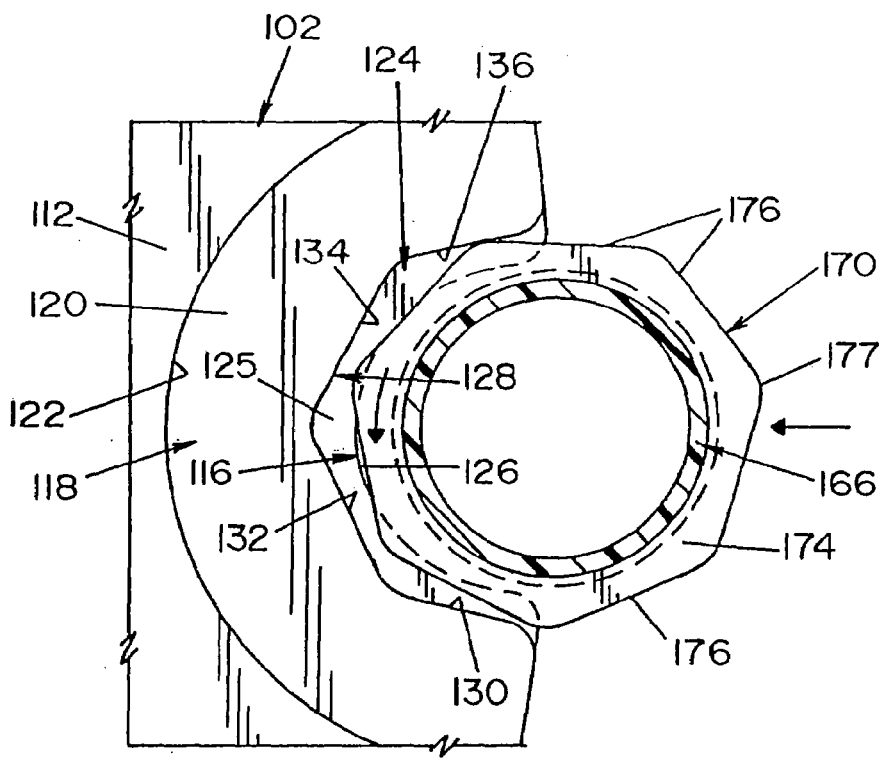
Figure 7:
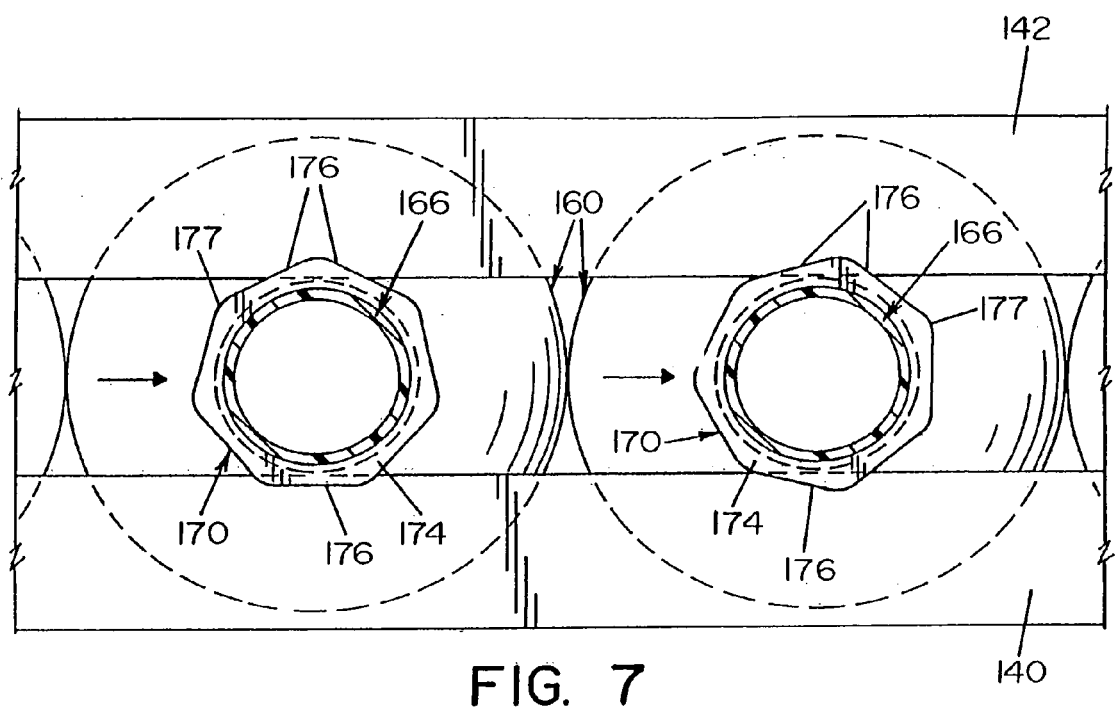
FIG. 7 is a partial plan view of the anti-rotation flange of two bottle being conveyed along a guide rail.

The upper neck 161 and mouth-forming portion 162 also includes an anti-rotation flange 170 positioned above the transition portion 164. The anti-rotation flange includes an underside surface 172 and a topside surface 174. Underside surface 172 is adapted to be partially or fully supported in pocket 116 of anti-rotation plate during the capping process. Underside surface 172 is also adapted to be partially or fully supported by guide rails 140, 142 when the bottle is being conveyed to and/or from the bottling and/or capping apparatus as illustrated in FIG. 7. As shown in FIGS. 1,3 and 5–7, the anti-rotation flange has seven sides 176 that form a generally heptagonal shape which are joined by apexes 177. The odd number of sides inhibits or prevents the anti-rotation flange from disengaging from guide rails 140, 142 when the bottle is being conveyed to and/or from the bottling and/or capping apparatus which will be discussed in greater detail below. The sides of the anti-rotation flange also enable one or more sides of the anti-rotation flange to partially or fully mate with the anti-rotation wall in pocket 116 to inhibit or prevent rotation of the bottle during the capping process. The mating of the one or more sides of the anti-rotation flange with the anti-rotation wall in pocket 116 is illustrated in FIGS. 6A and 6B. In this respect, the anti-rotation flange is positioned in pocket 116 such that the anti-rotation flange is not ideally oriented in pocket 116. When the bottles are conveyed to the bottling and/or capping apparatus, the bottles are oriented in various positions. However, during the bottle's movement on the star wheel and/or during the capping process, the bottle will be rotated as shown by the arrows in FIGS. 6A and 6B, thereby resulting in the anti-rotation flange becoming properly oriented with respect to the anti-rotation wall in pocket 116, thus resulting in the inhibiting or preventing of further rotation of the bottle during the capping process.

Figure 8A:
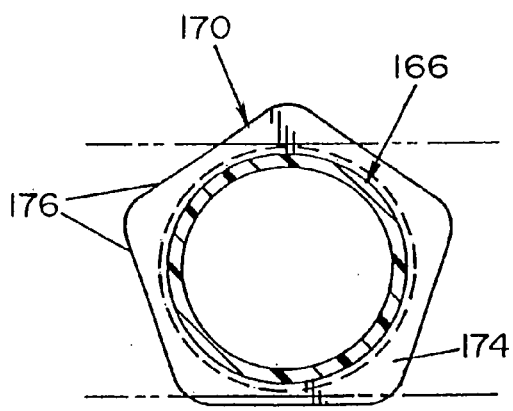
FIG. 8A–8C are plan views of various non-limiting configurations of the anti-rotation flange.
Figure 8B:
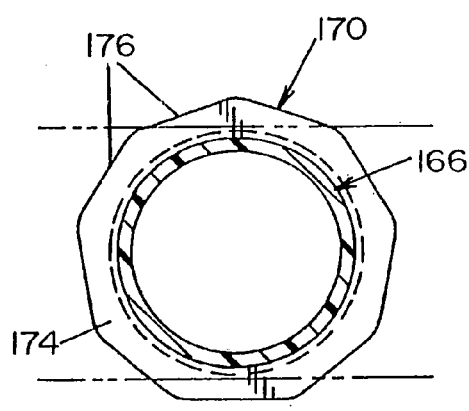
Figure 8C:
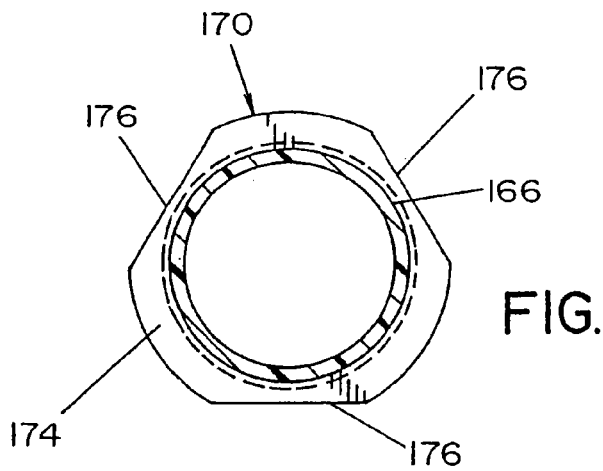

Referring now to FIG. 8A–8C, several other non-limiting configurations of the polygonal anti-rotation flange can be used on bottle 160 to inhibit or prevent rotation of the bottle during the capping process and/or inhibit or prevent the anti-rotation flange from disengaging from the guide rails when the bottle is being conveyed to and/or from the bottling and/or capping apparatus. As shown in FIG. 8A, the anti-rotation flange has five generally equal length sides 176 thereby forming a pentagon. In FIG. 8B, the anti-rotation flange has nine generally equal length sides 176 thereby forming a nonagon. As can be appreciated, the anti-rotation flange can be formed to have less than five generally equal length sides or more than nine generally equal length sides. When equal length straight sides are used, the number of sides is preferably an odd number. As can be appreciated, when non-equal length straight sides are used, the number of sides on the anti-rotation flange can be an odd or even number. In FIG. 8C, the anti-rotation flange has three generally equal length sides 176 thereby forming a modified triangular shape. Many other polygonal anti-rotation flanges can be used that inhibit or prevent rotation of the bottle during the capping process and/or inhibit or prevent the anti-rotation flange from disengaging from the guide rails when the bottle is being conveyed to and/or from the bottling and/or capping apparatus. These other configurations fall within the scope of this invention.

As shown in FIG. 2, lower base-forming portion 190 of container 160 includes a central portion 192 having a hemispherical or champagne-type configuration. As can be appreciated, lower base-forming portion 190 can have other configurations such as having a plurality of foot-forming portions (not shown) formed about the central portion for supporting bottle 160 or a flat base (also not shown).

Referring to FIG. 7 and FIG. 9–15, anti-rotational flange 170 is of the seven-sided polygonal configuration sized to replace a round flange schematically shown as flange 350 and work in connection with existing conveying systems without significant modification to the conveying system. It should be noted, however, that other polygonal configurations could be used. In addition, the support and stability portions of the conveying system discussed below are often utilized in all aspects of the container movement even though they are only discussed in particular detail below in relation to the empty container movement. Turning now to conveying systems used to transport the empty bottles to the capping and filling station, any known system can be used. The important aspect is to ability to utilize bottle 160 with anti-rotation flange 170 in existing conveying systems without significant modification.

Figure 9:
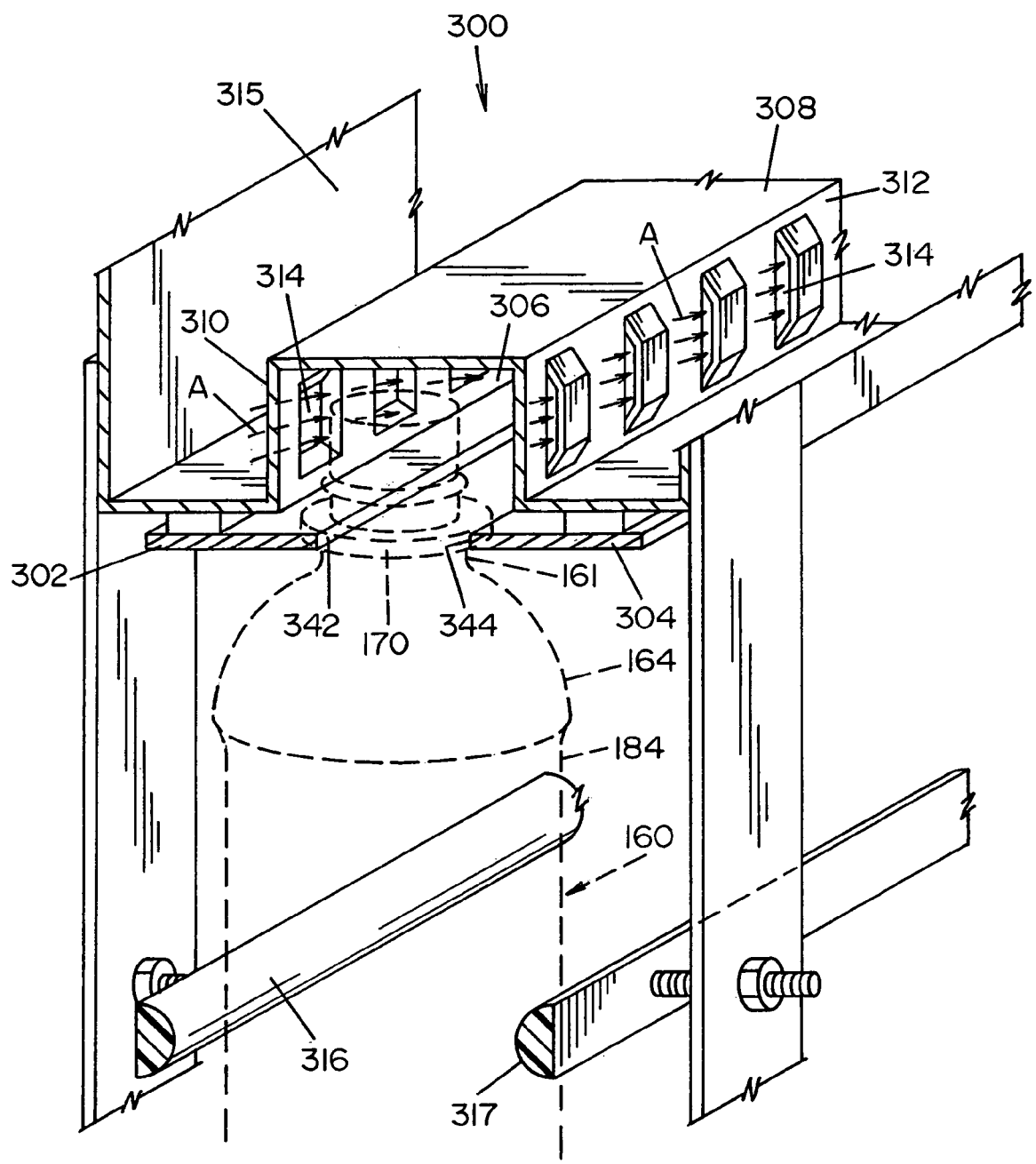
FIG. 9 is a perspective view of an air-powered bottle conveying system.
Figure 10:
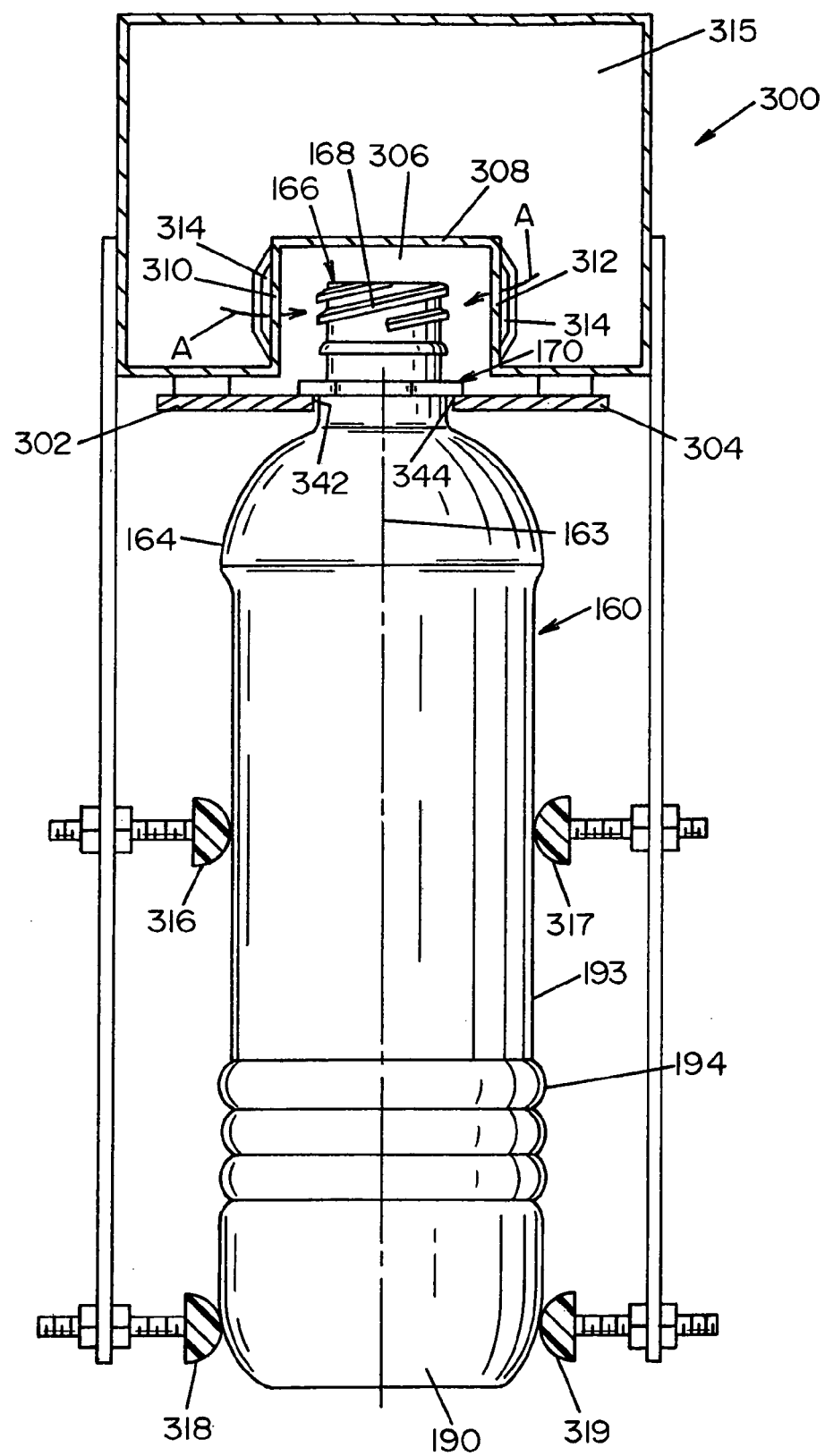
FIG. 10 is a sectioned elevational view of the conveying system shown in FIG. 9.
Figure 10A:
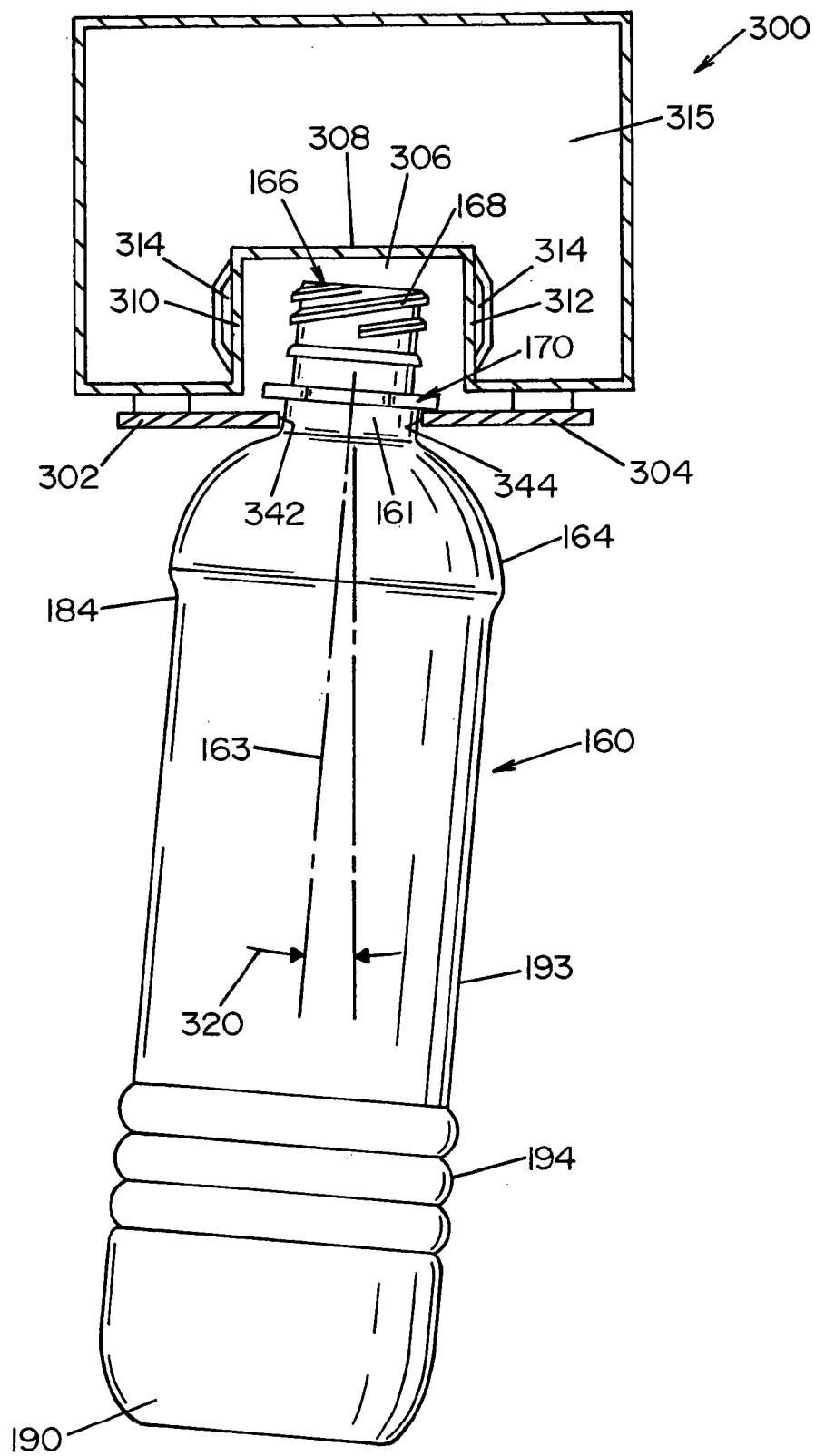
FIG. 10A is a partial sectioned elevational view of the conveyor shown in FIG. 9 wherein the plastic bottle is canted.
Figure 11:
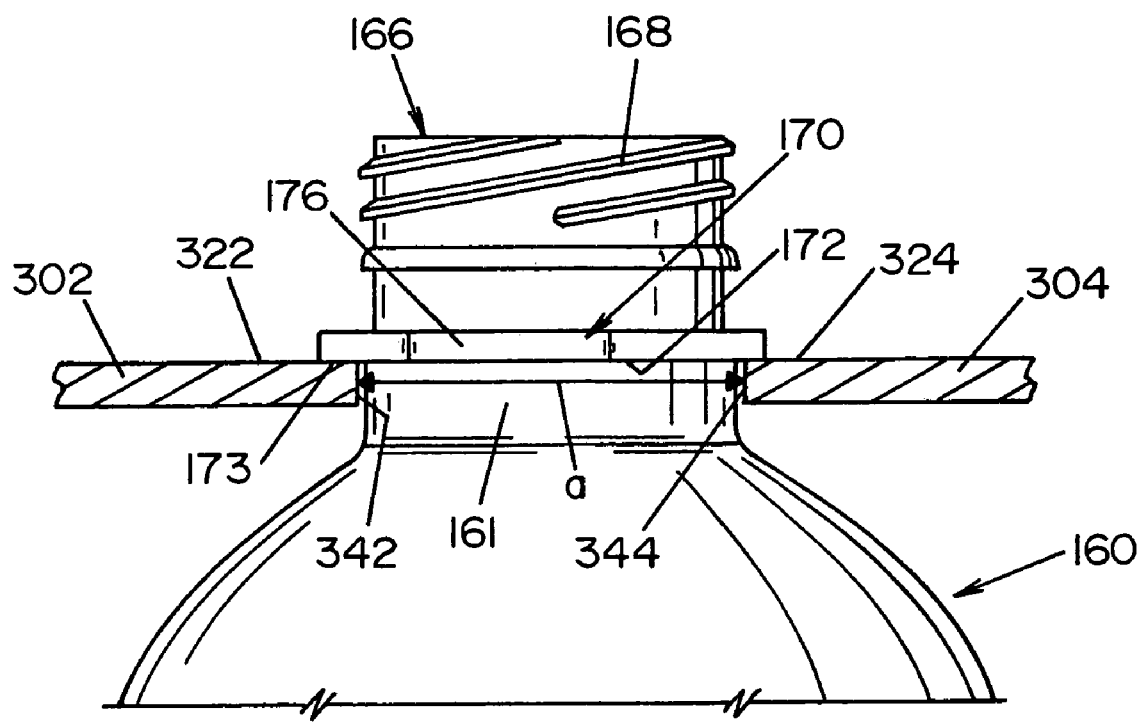
FIG. 11 is an enlarged partial sectional view showing the engagement between the bottle flange and the rails of the conveying system.

With particular reference to FIG. 9, an air-powered conveyor system 300 is shown. Air-powered conveying systems are known in the art and are shown in U.S. Pat. Nos. 4,284,370; 5,161,919; and, 5,437,521 which have been incorporated by reference herein as background information. In general terms, air-powered conveyor 300 includes inwardly extending track rails 302 and 304 which support and guide bottle 160 as it moves along the conveying system. Rails 302 each have an inner edge 342 and 344 that face one another and are spaced from one another a distance "a" along the majority of the length of the conveyor system. Distance "a" is preferably approximately 1.060 inches to provides unrestricted passage of neck 161 of bottle 160 that has a neck diameter approximately equal to 1.030 inches. The difference between the neck diameter and distance "a", also allows allow for variations in both the rails and the neck of one bottle to the next. But distance "a," is sufficiently small to prevent the passage of flange 170 thereby supporting the bottle by the flange. As will be appreciated, even though only one bottle is shown, the conveying system would include numerous bottles front to back one another during the filling operations. Air conveyor 300 further includes an elongate plenum chamber 315 having an air conveying channel 306 formed by atop wall 308 and side walls 310, 312. Both side walls 310, 312 include a plurality of air conveying slots 314 lying in a row along the length of the side walls. These side walls transfer the air from the plenum chamber to air channel 306 and into contact with bottle 160 thereby moving the bottle in the direction of the flowing air. Pressurized air A is applied and flows as is shown in FIG. 9 to moves the bottle. Conveyor 300 further includes guides 316–319 which help maintain bottle 160 in the proper orientation relative to rails 302 and 304. As can be appreciated, maintaining a proper alignment between the bottle and the conveying system is important to minimize the chance of a bottle becoming dislodged from the conveying system or jammed in the conveying system. If angle 319 becomes excessive, bottle 160 can become jammed or can fall from the rails. Furthermore, if the bottle rotates relative to track rails 302, 304 about bottle axis 163, a polygonal flange can disengage from rails 302 and 304 which will be discussed in greater detail below. As can be further appreciated, modifications to the track rails of the conveying system can be costly in both downtime to the bottling process and the labor involved in making the modifications which makes it advantageous to minimize the modifications when a new bottle or a new bottle flange is used.

The configuration of a flange determines how well the flange will be maintained by the rails of the conveying system. Anti-rotational flange 170 provides the benefits discussed above in relation to the capping process and also works in connection with existing conveying systems without modifications. In fact, flange 170 minimizes the chances of bottle 160 becoming jammed or dislodged from rails 302 and 304 even during bottle rotation about the bottle axis and/or bottle canting about the bottle axis. In this respect and with particular reference to FIG. 12–15, shown are schematic representations of anti-rotational flanges 170, 370 and 372 having a polygonal configuration with seven sides and round flange 350 which is to be replace with flange 170. Flanges 170, 370 and 372 all include seven apexes 177 which are diametrically opposite to one of seven sides 176. Accordingly, a seven equally sided anti-rotational flange has a diametrical distance "b" between each of apexes 177 and corresponding side 176. Diametrical distance "b" determines, at least in part, how bottle 160 having the anti-rotational flange will work in connection with conveyor 300 in comparison to a round flange bottle.

Figure 12:
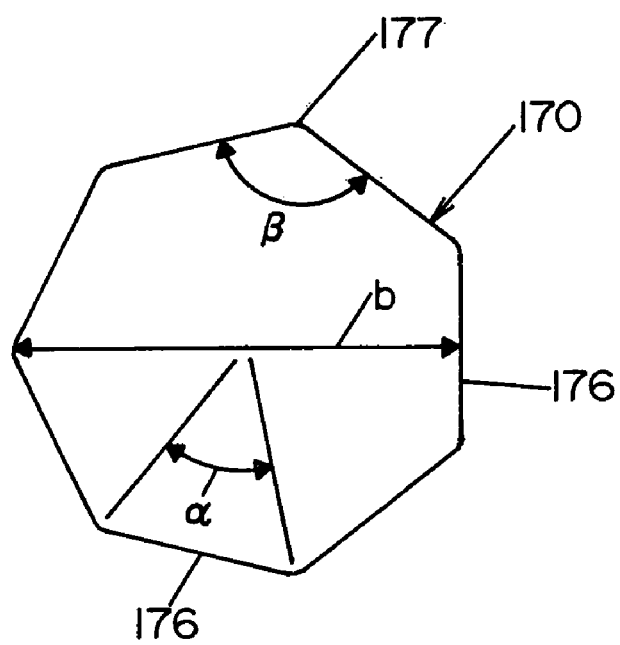
FIG. 12 is a schematic representation showing a diametric distance for an anti-rotation flange according to the present invention.
Figure 13:
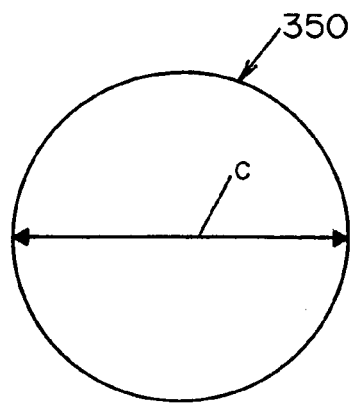
FIG. 13 is a schematic representation showing the diameter of a round flange.
Figure 14:
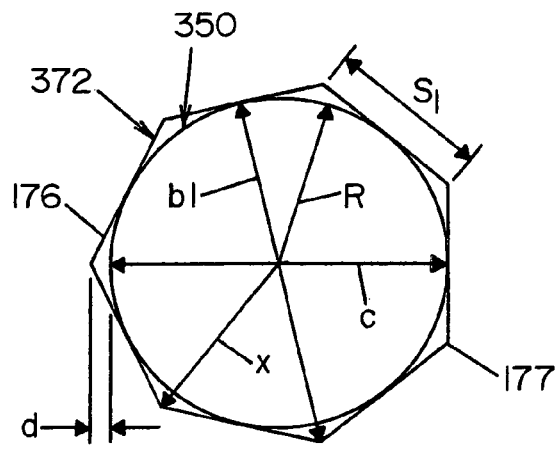
FIG. 14 is schematic representation showing the diametric distance of one anti-rotational flange relative to a round flange.

Comparing a prior art round flange 350 to flanges 170, 370 and 372, round flange 350 has a diameter "c" and the spacing "a" between track rails 300 and 302 are such that the bottle neck can freely pass, however, the round flange with diameter "c" will not fall from or jam in the rails even if the bottle rotates and/or cants relative to the bottle axis. Diameter "c" of the round flange 350 for at least these discussions concerning this invention is approximately 1.300 inches. But it should be noted that other round flanges can be replaced with the flange of this application without deviating from the invention. A seven-sided polygonal anti-rotational flange 370 (FIG. 15) sized to be inscribed in a traditional round flange, will have a diametrical distance b2 which is less than diameter "c" of the prior art round flanges by a value of "e". In the case of a replacement flange anti-rotation flange 170 sized to be inscribed in round flange 350 (1.300 inch diameter), the diametrical distance "b2" would be approximately 0.064 inch less than diameter "c" or 1.236 inches (see calculations below). As a result of the smaller diametrical distance, flange 170 is more likely to disengage from rails 302 and 304. This is especially true when the bottle rotates and/or cants relative to the bottle axis. To overcome this condition, it has been found that a range of diametrical distances for the anti-rotational flange can greatly reduce the probability of dislodging or jamming in the conveyor while still allowing the flange to be used in connection with existing bottling equipment. Set forth below are the formulas for calculating the diametrical distances b (b2-inscribed; b2-circumscribed) and the length of sides 176:

With Particular Reference to FIGS. 12 and 14 (Circumscribed Flange)

$$S_2 = C \times \sin\frac{\alpha}{2} = 1.300 \times \sin\frac{51.43}{2}$$

Figure 15:
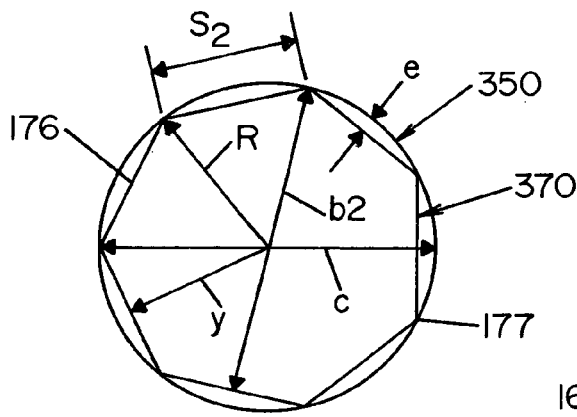
FIG. 15 is schematic representation showing the diametric distance of another anti-rotational flange relative to a round flange; and, FIG. 16 is an enlarged sectional view showing the anti-rotational flange according to the present invention resting on the rails of a conveyor system.

$S_1 = 0.626$ $x = 0.313 \times 2.31$ $x = 0.72$ $d = x - R = 0.72 - 0.65 = 0.070$ inches With Particular Reference to FIGS. 12 and 15 (Inscribed Flange)
α=51.43°
β=128.57

$$\alpha = \frac{360°}{\text{No. of sides}} = \frac{360°}{7} = 51.43°$$

$$\beta = 180 - \alpha \text{ or } 180° - \frac{360°}{\text{No. of sides}} \text{ or,}$$

$$\beta = \frac{\text{No. of sides} - 2}{\text{No. of sides}} \times 180° = \frac{5 \times 180°}{7} = 128.57°$$

$$S_1 = C \times \tan\frac{\alpha}{2} = 1.300 \tan\frac{51.43}{2}$$

$S_2$=0.564
y=0.28×2.08
y=0.586
e=R−y
e=0.65−0.586 e=0.064 inches

As stated above, a polygonal flange 370 with apexes 177 extending from bottle axis 163 an equal distance as radius "R" of round flange 350 (inscribed flange—FIG. 15), will have a higher probability of dislodging from the rails of the rack as the round flange 350. The cause of the increased probability is the diametric distance "b2" being approximately 0.064 inch less than the diameter "c" that is 1.300 inch. As a result, while this flange will adequately prevent rotation of the bottle during capping, the flange may not reliably work in connection with the conveying system without modification. By increasing the diametrical distance "b" of the flange it can be used in connection with existing conveying systems without significant modification. Furthermore, an anti-rotation flange with an increased diametrical distance can also be used in connection with the conveying portions of the bottling equipment without major modification. Turning to FIG. 14, anti-rotation flange 372 (circumscribed flange) is shown which is sized such that sides 176 are essentially schematically tangent to the peripheral edge of flange 350 and diametrical distance "b1" is larger than diameter "c" of flange 360 by a value of "d".

Preferably, the diametrical distance "b" is no less than 0.044 inch smaller than diameter "c" of the replaced 1.300 inch round flange container. Even more preferably, the diametric distance "b" of flange 170 is no less than 0.022 inch smaller than diameter "c" of the replaced round flange. By having a diametrical distance which is only slightly less than the diameter "c" of the replaced round flange, bottle 160 with anti-rotational flange 170 can be used in connection with existing air-powered conveying systems without modification to the conveying system. In one example, the diametric distance "b" can be in the range of 1.250 and 1.390 inches. In another example, the diametric distance "b" can be in the range of 1.270 and 1.375 inches. In yet another example; the diametric distance "b" can be in the range of 1.290 and 1.375 inches. In even yet another example, the diametrical distance can be at least 0.195 inches greater than the neck diameter of the bottle. In a further example, the diametrical distance can be at least 0.220 inches greater than the neck diameter of the bottle. In yet even a further example, the diametrical distance can be at least 0.245 inches greater than the neck diameter of the bottle. In another example, the diametrical distance can be at least 0.300 inches greater than the neck diameter of the bottle. These ranges of diametrical distances have been found to provide the needed bottle stability to allow the bottle to be used on existing conveying systems. A further way to calculate the desired diametrical distance of the flange is based on the rails of the existing conveying system. In this respect, the diametrical distance can be set at least 0.185 inch greater than the track rail spacing. In another example, which utilizes track spacing to determine the optimal diametrical distance, the diametrical distance can be set at least 0.195 inch greater than the track rail spacing. In yet another example, which utilizes track spacing to determine the optimal diametrical distance, the diametrical distance can be set at least 0.225 inch greater than the track rail spacing. In even yet another example, which utilizes track spacing to determine the optimal diametrical distance, the diametrical distance can be set at least 0.255 inch greater than the track rail spacing. In yet even another method of calculating the desired diametrical distance, the diametrical distance can be determined based on a percentage of the track spacing. In this respect, the diametrical distance can be at least 17 percent greater than the track rail spacing. In another example, which utilizes track spacing to determine the optimal diametrical distance, the diametrical distance can be set at least 19 percent greater than the track rail spacing. In yet another example, which utilizes track spacing to determine the optimal diametrical distance, the diametrical distance can be set at least 22 percent greater than the track rail spacing. In a further example, which utilizes track spacing to determine the optimal diametrical distance, the diametrical distance can be set at least 25 percent greater than the track rail spacing. In a further method of calculating the desired diametrical distance, the diametrical distance can be determined based on the size of an existing round flange. In this respect, the diametrical distance can be set to no more than 0.050 inches smaller than the existing round flange diameter of the replaced container. In another example, the diametrical distance can be set to no more than 0.045 inches smaller than the existing round flange diameter of the replaced container. In yet another example, the diametrical distance can be set to no more than 0.022 inches smaller than the existing round flange diameter of the replaced container. In order to add an additional level of stability, the diametrical distance "b" can be approximately equal to or greater than diameter "c" of the replaced round flange container such as is shown in FIG. 14 (circumscribed flange). Further, the diametrical distance can be more than 0.050 inches greater than the existing round flange diameter of the replaced container.

Figure 16:
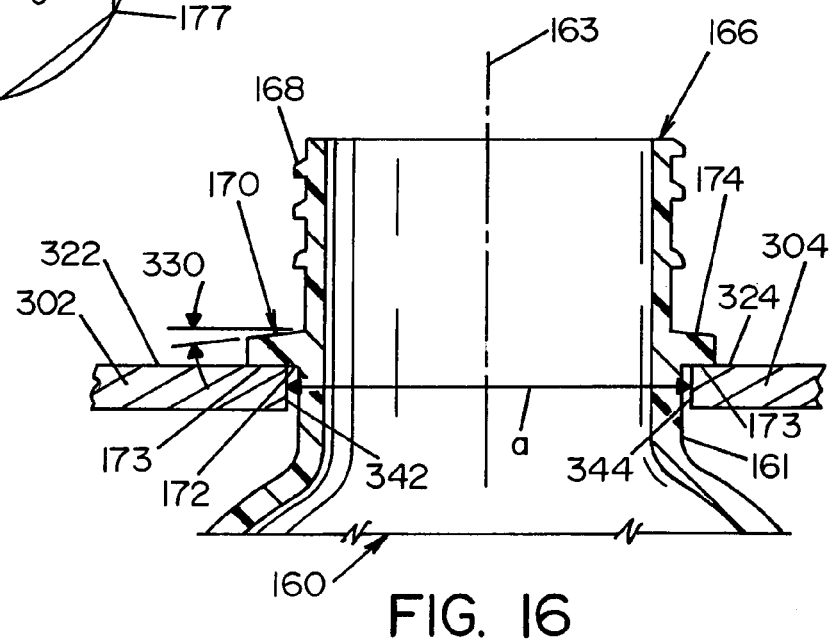

To help reduce bottle canting discussed above, bottom surface 172 of flange 170 includes a flat surface portion 173 that is perpendicular to bottle axis 163 thereby creating additional stability of bottle 160 relative to rails 302, 304. Surface portion 173 can be some or virtually all of bottom surface 172. In this respect, by including a flat bottom surface portion 173 that engages the conveyor rails, bottle 160 is better maintained in a vertical position relative to the upper surface of the rails and is more stable as it move along the rails. In this respect, with particular reference to FIG. 16, rails 302 and 304 have upwardly facing surfaces 322 and 324 respectively. Surfaces 322 and 324 are coplanar and are perpendicular to the desired orientation of bottle axis 163. Accordingly, by including flat bottom surface portion 173, bottle 160 is better maintained in the proper orientation. As is stated above, this surface can be some or all of bottom surface 172. For example, flat portion 173 can be spaced at least 0.005" from bottle neck 161 of bottle 160. In another example. flat portion 173 can be spaced at least 0.025" from the bottle neck. Turning to top surface 174, there is no need for this surface to be perpendicular to bottle axis 163. In fact, it is preferred that top surface 174 be non-parallel to bottom surface 172 by an angle 330. Preferably, angle 330 is less than 5.degree.

The bottle can be formed into a variety of dimensions to satisfy a particular use. Typically, the bottle is sized for 16-ounce applications, 20-ounce applications, one-applications, one-liter applications, two-quart applications, two-liter applications, and one-gallon applications. As can be appreciated, other sized bottles can be used. For instance, a bottle for containing 20 ounces can have an overall height of about 7–9 inches, for filling within about 1.25–2 inches of the mouth. When the bottle is a plastic bottle, the upper neck and mouth-forming portion can be finished with a threaded opening (e.g. PCO-28 finish). As can be appreciated, a sports top that allows for easy opening and closing of the mouth can be additionally or alternatively inserted in the mouth of the bottle. The cylindrical sidewall of the bottle can have a maximum diameter of about 2.25–3.5 inches. A reduced label panel diameter 193 on the sidewall can be used as shown in FIG. 2. If such panel diameter is used, the diameter can be about 2–3.25 inches. Additionally and/or alternatively, the sidewall can include one or more ribs 194 extending about the central axis 163 of the bottle. A number of other configurations can be incorporated on the sidewall for structural and/or aesthetic purposes. The neck-forming transition between the cylindrical sidewall and the mouth can be an ogive shape extending downwardly from about 0.5–1.5 inch below the mouth of to blend into the cylindrical sidewall approximately 2–3.5 inches below the mouth. The base of the bottle can be substantially flat, convex, and/or include a plurality of feet or legs. If the bottle is a plastic bottle that includes feet or legs, such configuration can be the same or similar to configurations disclosed in U.S. Pat. Nos. 4,978,015; 5,603,423; and 6,276,546, which are incorporated herein by reference.

In another example, a bottle for containing two liters can have an overall height of about 10–13 inches, for filling within about 1–2.25 inches of the mouth. The finish of the bottle, when made of plastic, can be a threaded opening with a PCO-28 finish. The cylindrical sidewall of the improved bottle can have a maximum diameter of about 3.5–5 inches. A reduced label panel diameter on the sidewall can be used. If such panel diameter is used, the diameter can be about 3.25–4.75 inches. Additionally and/or alternatively, the sidewall can include one or more ribs extending about the central axis of the bottle. A number of other configurations can be incorporated on the sidewall for structural and/or aesthetic purposes. The neck-forming transition between the cylindrical sidewall and the mouth can be an ogive shape extending downwardly from about 0.5–1.5 inch below the mouth to blend into the cylindrical sidewall approximately 3–5 inches below the mouth. The base of the bottle can be substantially flat, convex, and/or include a plurality of feet or legs. If the improved plastic container includes feet or legs, such configuration can be the same or similar to configurations disclosed above.

Bottle 160 can be formed by a number of standard techniques. Typically, when the bottle is formed of plastic, the bottle is formed from PET; however, other plastics can be used. Generally, the processing of the plastic bottle involves the injection molding of PET into what is commonly referred to as a "preform" and then blow-molding such preform into the improved plastic container. PET is a polymer with a combination of properties that are desirable for the packaging of carbonated and non-carbonated beverages including toughness, clarity, creep resistance, strength, and a high gas barrier. Furthermore, because PET is a thermoplastic, it can be recycled by the application of heat. Solid PET exists in three basic forms, namely amorphous, crystalline, and biaxially oriented. PET in the amorphous state is clear and colorless and is only moderately strong and tough. This is the state that preforms are in upon being injection molded. Crystalline PET is formed when molten PET is cooled slowly to below about 80° C. In the crystalline state, PET appears opaque, milky-white and is brittle. Oriented PET is formed by mechanically stretching amorphous PET at above about 80° C. and then cooling the material. Biaxially oriented PET is usually very strong, clear, tough, and has good gas barrier properties. Therefore, in the design of plastic containers made of PET, it is desirable to obtain as much biaxial orientation as is possible. Various types of PET material can be used in the manufacture of the improved plastic container. Typical values of intrinsic viscosity for PET bottle manufacture are in the range of about 0.65 to 0.85.

The bottle, when formed of plastic, can be formed by a conventional injection-molded preform. As known in the art, various configurations of preforms for a desired plastic bottle can be used to make various plastic bottle designs. The use of a particular preform with a particular plastic bottle design is a matter of design and the selection criteria. It may be advantageous to alter the design of the preform to optimize the final plastic bottle design. For instance, it may be advantageous to taper the bottom of the preform to allow better orientation and distribution of material. As can be appreciated, other alterations can be used. The improved plastic container can be formed by a conventional stretch blow-molding process. In such a process, biaxial orientation is introduced into the PET by producing stretch along both the length of the improved plastic container and the circumference of the improved plastic container. In stretch blow-molding, a stretch rod is utilized to elongate the preform, and air or other gas pressure is used to radially stretch the preform, both of which happen essentially simultaneously. Prior to blow-molding, the preforms are preheated to the correct temperature, generally about 100° C., but this temperature can vary depending upon the particular PET material used. Once the PET preform is at the desired temperature, it is typically secured by its neck in a mold which has a cavity of the desired plastic container shape. A stretch rod is introduced into the mouth of the improved plastic container to distribute the material the length of the improved plastic container. Simultaneously, air can be blown into the improved plastic container from around the stretch rod to distribute the material radially to give the radial or hoop orientation. Air pressure pushes the improved plastic container walls against the mold, which is generally cooled, causing the PET to cool. After sufficient cooling has taken place, to avoid plastic bottle shrinkage, the mold is opened and the improved plastic container is discharged.

The invention can thus provide durable bottle for carbonated and non-carbonated beverages. When the bottle is formed of plastic, the plastic bottle can be formed at a low cost and low weight manufacturable from plastic material by molding with minimal plastic material, with maximal volumes with minimal heights in easily handled diameters, with maximal height cylindrical sidewall portions, with excellent stability in both filled and unfilled conditions.

The present invention has been described with reference to a number of different embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus described the invention, it is so claimed:

1. A plastic container for beverages comprising: a central axis; an upper mouth portion; a neck portion coaxial to said axis with a diameter, a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said diametrical distance being in the range of 1.250 and 1.390 inches.

2. The container of claim 1, wherein said diametrical distance is in the range of 1.270 and 1.375 inches.

3. The container of claim 1, wherein said diametrical distance is in the range of 1.290 and 1.375 inches.

4. The container of claim 1, wherein said polygonal peripheral edge is a heptagon.

5. The container of claim 1, wherein said anti-rotation flange has a bottom surface with a flat portion perpendicular to said bottle axis.

6. The container of claim 5, wherein said flat portion of said bottom surface is spaced at least 0.005" from said bottle neck.

7. The container of claim 5, wherein said flat portion of said bottom surface is spaced at least 0.025" from said bottle neck.

8. A plastic container for beverages comprising: a central axis; an upper mouth portion; a neck portion coaxial to said axis with a diameter, a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said diametrical distance being at least 0.195 inch greater than said neck diameter.

9. The container of claim 8, wherein said diametrical distance is at least 0.220 inch greater than said neck diameter.

10. The container of claim 8, wherein said diametrical distance is at least 0.245 inch greater than said neck diameter.

11. The container of claim 8, wherein said diametrical distance is at least 0.300 inch greater than said neck diameter.

12. The container of claim 8, wherein said polygonal peripheral edge is a heptagon.

13. The container of claim 8, wherein said anti-rotation flange has a bottom surface with a flat portion perpendicular to said bottle axis.

14. The container of claim 13, wherein said flat portion of said bottom surface is spaced at least 0.005" from said bottle neck.

15. The container of claim 13, wherein said flat portion of said bottom surface is spaced at least 0.025" from said bottle neck.

16. A plastic container for beverages to be conveyed by air along a track with inwardly extending track rails spaced from one another a set distance, said container comprising: a central axis; an upper mouth portion; a neck portion coaxial to said axis with a diameter less than said set distance of said track rail spacing; a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said diametrical distance being at least 0.185 inch greater than said set distance of said track rail spacing.

17. The container of claim 16, wherein said diametrical distance is at least 0.195 inch greater than said set distance of said track rail spacing.

18. The container of claim 16, wherein said diametrical distance at least 0.225 inch greater than said set distance of said track rail spacing.

19. The container of claim 16, wherein said diametrical distance at least 0.255 inch greater than said set distance of said track rail spacing.

20. The container of claim 16, wherein said polygonal peripheral edge is a heptagon.

21. The container of claim 16, wherein said anti-rotation flange has a bottom surface with a flat portion perpendicular to said bottle axis.

22. A plastic container for beverages to be conveyed by air along a track with inwardly extending track rails spaced from one another a set distance, said container comprising: a central axis; an upper mouth portion; a neck portion coaxial to said axis with a diameter less than said set distance of said track rail spacing; a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite to said apex, said diametrical distance at least 17 percent greater than said set distance of said track rail spacing.

23. The container of claim 22, wherein said diametrical distance at least 19 percent greater than said set distance of said track rail spacing.

24. The container of claim 22, wherein said diametrical distance at least 22 percent greater than said set distance of said track rail spacing.

25. The container of claim 22, wherein said diametrical distance at least 25 percent greater than said set distance of said track rail spacing.

26. The container of claim 22, wherein said polygonal peripheral edge is a heptagon.

27. The container of claim 22, wherein said anti-rotation flange has a bottom surface with a flat portion perpendicular to said bottle axis.

28. A plastic container for beverages to replace a plastic container having a round flange with a round flange diameter, the replaced container being adapted to be conveyed by air along a track with inwardly extending track rails spaced from one another a set distance, said container replacing the replaced container without modifying the inwardly extending track rails of the track, said container comprising: a central axis; an upper mouth portion; a neck portion coaxial to said axis with a diameter, a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said plurality of apexes together defining an outer apex diameter, each of said plurality of flats having a central point and said central points together defining an inner flat diameter, said inner flat diameter being no more than 0.115 inch smaller than the round flange diameter of the replaced container.

29. The container of claim 28, wherein said inner flat diameter is no more than 0.090 inch smaller than the round flange diameter.

30. The container of claim 28, wherein said inner flat diameter is no more than 0.050 inch smaller than round flange diameter.

31. The container of claim 28, wherein said inner flat diameter is approximately equal to the round flange diameter.

32. The container of claim 28, wherein said polygonal peripheral edge is a heptagon.

33. The container of claim 28, wherein said anti-rotation flange has a bottom surface with a flat portion perpendicular to said bottle axis.

34. A plastic container for beverages to replace a plastic container having a round flange with a round flange diameter, the replaced container being adapted to be conveyed by air along a track with inwardly extending track rails spaced from one another a set distance, said container replacing the replaced container without modifying the inwardly extending track rails of the track, said container comprising: a central axis; an upper mouth portion; a neck portion coaxial to said axis with a diameter, a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said diametrical distance being no more than 0.050 inch smaller than the round flange diameter of the replaced container.

35. The container of claim 34, wherein said diametrical distance is no more than 0.045 inch smaller than the round flange diameter.

36. The container of claim 34, wherein said diametrical distance is no more than 0.022 inch smaller than the round flange diameter.

37. The container of claim 34, wherein said diametrical distance is greater than the round flange diameter.

38. The container of claim 34, wherein said diametrical distance is 0.05 inches greater than the round flange diameter.

39. The container of claim 34, wherein said polygonal peripheral edge is a heptagon.

40. The container of claim 34, wherein said anti-rotation flange has a bottom surface with a flat portion perpendicular to said bottle axis.

41. A plastic container for beverages to replace a plastic container having a round flange with a round flange diameter, the replaced container being adapted to be conveyed by air along a track with inwardly extending track rails spaced from one another a set distance, said container replacing the replaced container without modifying the inwardly extending track rails of the track, said container comprising: a central axis; an upper mouth portion; a neck portion coaxial to said axis with a diameter, a cylindrical sidewall; a lower base and an anti-rotation flange below said upper mouth portion having a polygonal peripheral edge with a shape including a plurality of flats and a plurality of apexes each located between adjacent flats and each apex being diametrically opposite one of said flats, said peripheral edge having a diametrical distance between each of said apexes and the flat opposite said apex, said plurality of apexes together defining an outer apex diameter, each of said plurality of flats having a central point and said central points together defining an inner flat diameter, said outer apex diameter being greater than the round flange diameter of the replaced container.

42. The container of claim 41, wherein said polygonal peripheral edge is a heptagon.

43. The container of claim 41, wherein said anti-rotation flange has a bottom surface with a flat portion perpendicular to said bottle axis.

\* \* \* \* \*